(12) United States Patent
Park et al.

(10) Patent No.: US 12,526,397 B2
(45) Date of Patent: Jan. 13, 2026

(54) DISPLAY DEVICE AND CHECKING SYSTEM INCLUDING THE SAME

(71) Applicant: SAMSUNG DISPLAY CO., LTD., Yongin-si (KR)

(72) Inventors: Young Min Park, Yongin-si (KR); Jae Joong Kwon, Yongin-si (KR); O Jun Kwon, Yongin-si (KR); Jin Seo, Yongin-si (KR); A Ree Song, Yongin-si (KR); Eun Jung Lee, Yongin-si (KR); Ha Young Lee, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 103 days.

(21) Appl. No.: 18/383,520

(22) Filed: Oct. 25, 2023

(65) Prior Publication Data

US 2024/0214548 A1 Jun. 27, 2024

(30) Foreign Application Priority Data

Dec. 26, 2022 (KR) .......................... 10-2022-0184128

(51) Int. Cl.
*H04N 13/354* (2018.01)
*H04N 13/305* (2018.01)
*H04N 13/327* (2018.01)

(52) U.S. Cl.
CPC ......... *H04N 13/354* (2018.05); *H04N 13/305* (2018.05); *H04N 13/327* (2018.05)

(58) Field of Classification Search
CPC .. H04N 13/305; H04N 13/327; H04N 13/351; H04N 13/354

USPC ............................................................ 348/51
See application file for complete search history.

(56) References Cited

U.S. PATENT DOCUMENTS

| | | | |
|---|---|---|---|
| 2016/0202490 A1* | 7/2016 | Jung | G02F 1/29 349/123 |
| 2016/0259187 A1* | 9/2016 | Lee | G02F 1/13306 |
| 2024/0031543 A1* | 1/2024 | Atkins | H04N 13/376 |
| 2024/0339060 A1* | 10/2024 | Won | G09G 3/20 |

FOREIGN PATENT DOCUMENTS

| | | | | |
|---|---|---|---|---|
| JP | 2013007903 A | * | 1/2013 | ............. H04N 13/04 |
| JP | 6232229 | | 10/2017 | |
| KR | 10-2006-0054973 | | 5/2006 | |
| KR | 20130106725 A | * | 9/2013 | ............. H04N 13/04 |
| KR | 10-1350641 | | 1/2014 | |
| KR | 10-1826357 | | 2/2018 | |
| KR | 102420041 B1 | * | 7/2022 | ............. H04N 13/30 |
| WO | WO-2013008282 A1 | * | 1/2013 | ............... G09G 5/14 |

* cited by examiner

*Primary Examiner* — Behrooz M Senfi
(74) *Attorney, Agent, or Firm* — F. CHAU & ASSOCIATES, LLC

(57) ABSTRACT

A display device includes: a display panel including a display area and a plurality of sub-pixels disposed in the display area; an optical member bonded onto the display panel; and a display driving unit configured to receive a correction coefficient for each viewing viewpoint of the display panel from a checking device of the display panel, to which the optical member is bonded, configured to correct image data for each viewing viewpoint using the correction coefficient for each viewing viewpoint, and configured to drive the display panel so that an image according to the corrected image data is displayed in the display area.

20 Claims, 19 Drawing Sheets

FIG. 14

| VIEWPOINT | LUMINANCE | VIEWPOINT | LUMINANCE | VIEWPOINT | LUMINANCE | VIEWPOINT | LUMINANCE |
|---|---|---|---|---|---|---|---|
| 1-view | 207 | 7-view | 207 | 13-view | 207 | 19-view | 207 |
| 2-view | 206 | 8-view | 207 | 14-view | 206 | 20-view | 206 |
| 3-view | 207 | 9-view | 207 | 15-view | 206 | 21-view | 207 |
| 4-view | 207 | 10-view | 207 | 16-view | 207 | 22-view | 206 |
| 5-view | 208 | 11-view | 207 | 17-view | 208 | 23-view | 208 |
| 6-view | 208 | 12-view | 207 | 18-view | 208 | 24-view | 208 |

DISPLAY DEVICE AND CHECKING SYSTEM INCLUDING THE SAME

CROSS-REFERENCE TO RELATED APPLICATION

This application claims priority under 35 U.S.C. § 119 to Korean Patent Application No. 10-2022-0184128 filed on Dec. 26, 2022 in the Korean Intellectual Property Office, the disclosure of which is incorporated by reference herein in its entirety.

TECHNICAL FIELD

The present invention relates to a display device and a checking system including the same.

DISCUSSION OF THE RELATED ART

A stereoscopic image display device and a viewing angle control display device that divide and display an image of a display device in a space on a front surface of the display device using an optical member are currently under development. The stereoscopic image display device separates and displays a left-eye image and a right-eye image to enable a viewer to realize a three-dimensional effect according to binocular parallax.

The stereoscopic image display device is divided into a stereoscopic image display device of a stereoscopic technique and a stereoscopic image display device of an auto stereoscopic technique. Generally, the stereoscopic technique uses parallax images of the left and right eyes with a relatively large stereoscopic effect, and includes a glasses method and a glasses-free method, both of which are being put to practical use.

In the glasses method, the left and right parallax images are displayed by changing polarization thereof, and a stereoscopic image is implemented by using polarized glasses or implemented by using shutter glasses. In addition, in the glasses-free method, a stereoscopic image is implemented by forming an optical member such as a parallax barrier or a lenticular sheet in the display device and separating optical axes of the left and right parallax images. However, the stereoscopic image display device of the glasses-free method may result in parallax images, which are adjacent to each other, overlapping each other.

SUMMARY

According to an embodiment of the present invention, a display device includes: a display panel including a display area and a plurality of sub-pixels disposed in the display area; an optical member bonded onto the display panel; and a display driving unit configured to receive a correction coefficient for each viewing viewpoint of the display panel from a checking device of the display panel, to which the optical member is bonded, configured to correct image data for each viewing viewpoint using the correction coefficient for each viewing viewpoint, and configured to drive the display panel so that an image according to the corrected image data is displayed in the display area.

In an embodiment of the present invention, the display driving unit is configured to: set a viewing viewpoint and a viewing viewpoint number according to the viewing viewpoint for each sub-pixel according to a relative arrangement position of each sub-pixel for each stereoscopic lens of the plurality of stereoscopic lenses of the optical member, align an arrangement position for each horizontal line of the image data according to the viewing viewpoint and the viewing viewpoint number of each sub-pixel, and display an image according to corrected image data in the display area by correcting image data for each viewing viewpoint with the correction coefficient for each viewing viewpoint.

In an embodiment of the present invention, the checking device includes: an optical path conversion unit configured to modulate an optical path of a display image for each viewing viewpoint by reflecting the display image that is displayed on the display panel for each viewing viewpoint, an optical characteristic detection unit configured to generate and output an optical characteristic detection signal by sequentially detecting optical characteristics of the display image for each viewing viewpoint of which the optical path is modulated by the optical path conversion unit, and an optical characteristic analysis unit configured to generate and output a correction coefficient for each viewing viewpoint according to the optical characteristics for each viewing viewpoint by analyzing the optical characteristic detection signal for each viewing viewpoint output from the optical characteristic detection unit.

In an embodiment of the present invention, the viewing viewpoints and the viewing viewpoint numbers of the display panel correspond to or are included in a width of one of the stereoscopic lenses of the optical member in a thickness direction, and are set to be equal to the number of sub-pixels disposed on a first surface of each stereoscopic lens.

In an embodiment of the present invention, the optical characteristic detection unit is configured to: detect optical characteristics of any one of luminance, illumination, or light quantity of the display image for each viewing viewpoint that is displayed on the display panel and whose optical path is modulated by the optical path conversion unit, and transmit the optical characteristic detection signal corresponding to the optical characteristics of any one of the luminance, illumination, or light quantity to the optical characteristic analysis unit.

In an embodiment of the present invention, the optical characteristic analysis unit is configured to: convert the optical characteristic detection signal for each viewing viewpoint into a digital signal, and analyze an average optical characteristic value of remaining viewing viewpoints that is compared to the converted optical characteristic value for each viewing viewpoint, and extract or calculate the correction coefficient for each viewing viewpoint such that a difference between the optical characteristic value for each viewing viewpoint and the average optical characteristic value for the remaining viewing viewpoints is minimized by comparing the optical characteristic value for each viewing viewpoint with the average optical characteristic value of the remaining viewing viewpoints.

In an embodiment of the present invention, the optical path conversion unit includes: a flat reflective panel configured to change optical paths of display images for each viewing viewpoint by primarily reflecting and refracting the display images that are sequentially emitted from the display panel for each viewing viewpoint; and a curved reflective panel configured to condense the optical paths of the display images for each viewing viewpoint in a direction of the optical characteristic detection unit by secondarily reflecting and refracting the display images for each viewing viewpoint that are reflected from the flat reflective panel.

In an embodiment of the present invention, the optical path conversion unit further includes: a first position adjustment module configured to fix the display panel by adjusting an arrangement position and horizontal and vertical axis angles of the display panel so that the display panel is disposed toward the flat reflective panel; a second position adjustment module configured to fix the flat reflective panel by adjusting an arrangement position and horizontal and vertical axis angles of the flat reflective panel so that the display images for each viewing viewpoint that are displayed on the display panel are primarily reflected and refracted by the flat reflective panel to the curved reflective panel; and a third position adjustment module configured to fix the curved reflective panel by adjusting an arrangement position and horizontal and vertical axis angles of the curved reflective panel so that the display images for each viewing viewpoint that are primarily reflected and refracted by the flat reflective panel are secondarily reflected and refracted by the curved reflective panel to the optical characteristic detection unit.

In an embodiment of the present invention, the flat reflective panel is disposed and fixed at a position where lengths of light paths, for each viewing viewpoint, that are displayed on the display panel to be primarily reflected from the flat reflective panel and that are secondarily reflected from the curved reflective panel to be incident to the optical characteristic detection unit are all a same as each other.

In an embodiment of the present invention, the curved reflective panel is formed in a semicircular or a semi-elliptical curvature trajectory shape so that an inner surface forming a curvature maintains a same distance from the optical characteristic detection unit, and the optical characteristic detection unit is disposed at a position of a central point of the curvature trajectory formed by the curved reflective panel to maintain the same distance as a whole from the inner surface having the curvature of the curved reflective panel.

In an embodiment of the present invention, the optical characteristic detection unit is configured to: be installed in the first or second position adjustment module disposed in a direction facing the curved reflective panel, and be disposed in a direction facing the curved reflective panel to be directed to a center point of the curved reflective panel.

According to an embodiment of the present invention, a checking system includes: a display device configured to display a stereoscopic image through a display panel to which an optical member is attached; and a checking device configured to detect optical characteristics of a display image for each viewing viewpoint of the display panel and configured to generate and output a correction coefficient for each viewing viewpoint according to the optical characteristics for each viewing viewpoint, wherein the checking device is configured to: modulate an optical path of the display image for each viewing viewpoint by reflecting and refracting the display image that is displayed on the display panel for each viewing viewpoint, generate optical characteristic detection signals by detecting the optical characteristics of the display image for each viewing viewpoint in which the optical path is modulated, and extract a correction coefficient for each viewing viewpoint according to an analysis result of the optical characteristic detection signals for each viewing viewpoint and supply the extracted correction coefficient to the display device.

In an embodiment of the present invention, the checking device includes: an optical path conversion unit configured to modulate an optical path of a display image for each viewing viewpoint by reflecting the display image that is displayed on the display panel for each viewing viewpoint, an optical characteristic detection unit configured to generate and output an optical characteristic detection signal by sequentially detecting optical characteristics of the display image for each viewing viewpoint of which the optical path is modulated by the optical path conversion unit, and an optical characteristic analysis unit configured to generate and output a correction coefficient for each viewing viewpoint according to the optical characteristics for each viewing viewpoint by analyzing the optical characteristic detection signal for each viewing viewpoint output from the optical characteristic detection unit.

In an embodiment of the present invention, the optical characteristic detection unit is configured to: detect optical characteristics of any one of luminance, illumination, or light quantity of the display image for each viewing viewpoint that is displayed on the display panel and whose optical path is modulated by the optical path conversion unit, and transmit the optical characteristic detection signal corresponding to the optical characteristics of any one of the luminance, illumination, or light quantity to the optical characteristic analysis unit.

In an embodiment of the present invention, the optical characteristic analysis unit is configured to: convert the optical characteristic detection signal for each viewing viewpoint into a digital signal, and analyze average optical characteristic values of remaining viewing viewpoints that are compared to the converted optical characteristic value for each viewing viewpoint, and extract or calculate the correction coefficient for each viewing viewpoint such that a difference between the optical characteristic value for each viewing viewpoint and the average optical characteristic value for the remaining viewing viewpoints is minimized by comparing the optical characteristic value for each viewing viewpoint with the average optical characteristic value of the remaining viewing viewpoints.

In an embodiment of the present invention, the optical path conversion unit includes: a flat reflective panel configured to change optical paths of display images for each viewing viewpoint by primarily reflecting and refracting the display images that are sequentially emitted from the display panel for each viewing viewpoint; and a curved reflective panel configured to condense the optical paths of the display images for each viewing viewpoint in a direction of the optical characteristic detection unit by secondarily reflecting and refracting the display images for each viewing viewpoint that are reflected from the flat reflective panel.

In an embodiment of the present invention, the optical path conversion unit further includes: a first position adjustment module configured to fix the display panel by adjusting an arrangement position and horizontal and vertical axis angles of the display panel so that the display panel is disposed toward the flat reflective panel; a second position adjustment module configured to fix the flat reflective panel by adjusting an arrangement position and horizontal and vertical axis angles of the flat reflective panel so that the display images for each viewing viewpoint that are displayed on the display panel are primarily reflected and refracted by the flat reflective panel to the curved reflective panel; and a third position adjustment module configured to fix the curved reflective panel by adjusting an arrangement position and horizontal and vertical axis angles of the curved reflective panel so that the display images for each viewing viewpoint that are primarily reflected and refracted by the flat reflective panel are secondarily reflected and refracted by the curved reflective panel to the optical characteristic detection unit.

In an embodiment of the present invention, the flat reflective panel is disposed and fixed at a position where lengths of light paths, for each viewing viewpoint, that are displayed on the display panel to be primarily reflected from the flat reflective panel and that are secondarily reflected from the curved reflective panel to be incident to the optical characteristic detection unit are all a same as each other.

In an embodiment of the present invention, the curved reflective panel is formed in a semicircular or a semi-elliptical curvature trajectory shape so that an inner surface forming a curvature maintains a same distance from the optical characteristic detection unit, and the optical characteristic detection unit is disposed at a position of a central point of the curvature trajectory formed by the curved reflective panel to maintain the same distance as a whole from the inner surface having the curvature of the curved reflective panel.

In an embodiment of the present invention, the optical characteristic detection unit is configured to: be installed in the first or second position adjustment module disposed in a direction facing the curved reflective panel, and be disposed in a direction facing the curved reflective panel to be directed to a center point of the curved reflective panel.

BRIEF DESCRIPTION OF THE DRAWINGS

The above and other features of the present invention will become more apparent by describing in detail embodiments thereof with reference to the attached drawings, in which:

FIG. 14 is a table illustrating detection results of luminance values for each viewing viewpoint according to an embodiment of the present invention;

DETAILED DESCRIPTION OF THE EMBODIMENTS

Figure 1:
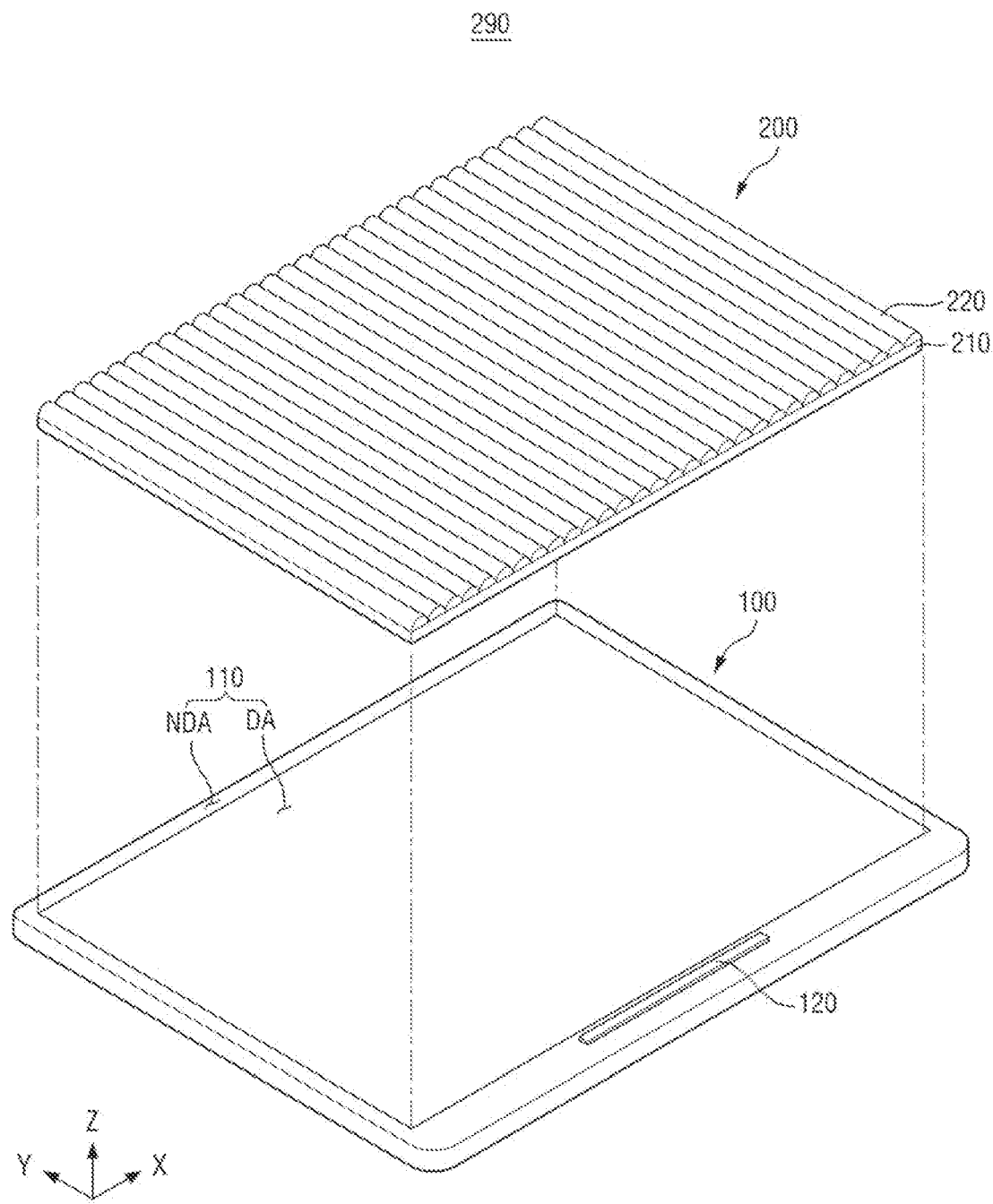
FIG. 1 is an exploded perspective view illustrating a display device according to an embodiment of the present invention.

The embodiments of the present invention will now be described more fully hereinafter with reference to the accompanying drawings. This invention may, however, be embodied in different forms and should not be construed as limited to the embodiments set forth herein.

It will also be understood that when a layer is referred to as being "on" another layer or substrate, it can be directly on the other layer or substrate, or intervening layers may also be present. In contrast, when an element is referred to as being "directly on" another element, there are no intervening elements present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the spirit and scope of the present invention. Similarly, the second element could be termed the first element.

As is traditional in the field of the present invention, some embodiments are described, and illustrated in the drawings, in terms of functional blocks, units and/or modules. Those skilled in the art will appreciate that some of these blocks, units and/or modules may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the present invention. Further, the blocks, units and/or modules of the embodiments may be physically combined into more complex blocks, units and/or modules without departing from the scope of the present invention.

Each of the features of the various embodiments of the present invention may be combined or combined with each other, in part or in whole, and, technically, various interlocking and driving are possible. Each embodiment may be implemented independently of each other or may be implemented together in an association.

Hereinafter, embodiments of the present invention will be described with reference to the accompanying drawings.

FIG. 1 is an exploded perspective view illustrating a display device according to an embodiment of the present invention. In addition, FIG. 2 is a view illustrating a coupling structure of a display panel and an optical member illustrated in FIG. 1.

Figure 2:
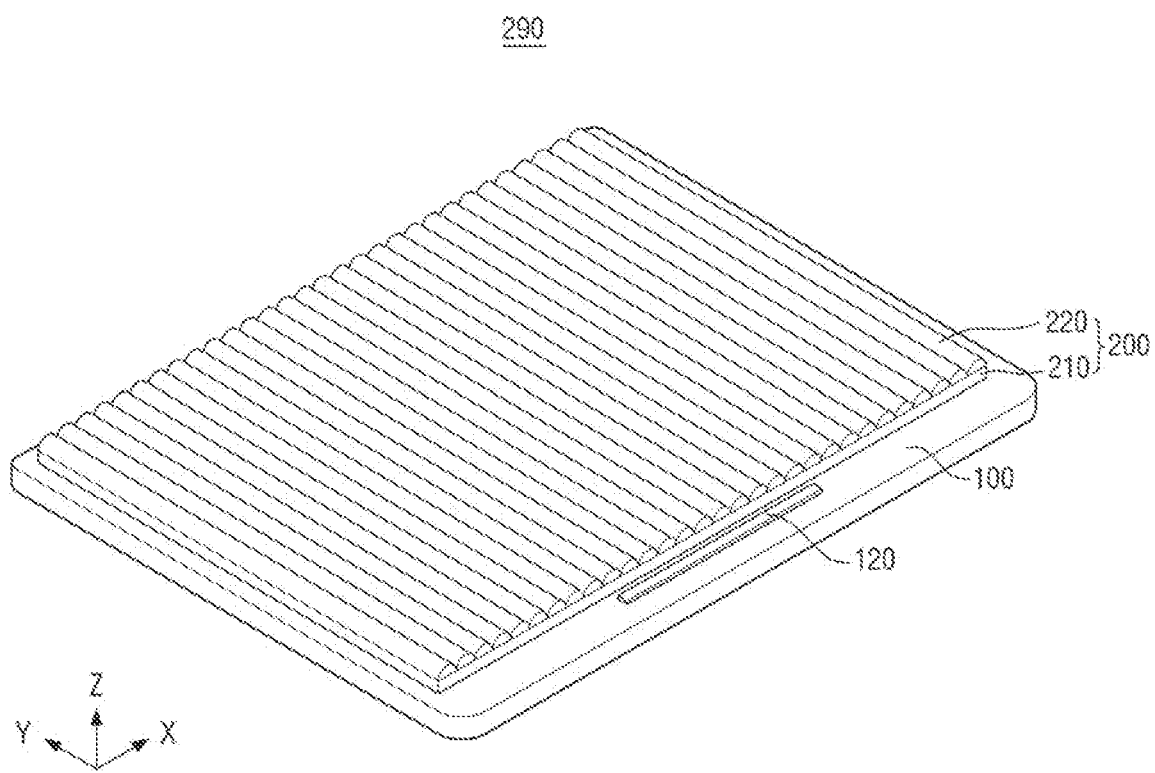
FIG. 2 is a view illustrating a coupling structure of a display panel and an optical member illustrated in FIG. 1.

Referring to FIGS. 1 and 2, a display device 290 may be implemented as, for example, flat panel display devices such as a liquid crystal display (LCD), a field emission display (FED), a plasma display panel (PDP), and an organic light emitting display (OLED).

The display device 290 may be a stereoscopic image display device including a display module 100 and an optical member 200. The stereoscopic image display device may separate and display a left-eye image and a right-eye image in a front direction to allow a viewer to realize a three-dimensional effect according to binocular parallax. Further, the stereoscopic image display device may separate and provide a plurality of viewing angle images to the front surface of the display device 290 so as to display different images for each of different viewing angles.

The stereoscopic image display device may be a light field display device in which the optical member 200 is disposed on a front surface of the display module 100 to allow a viewer's eyes to see different image information. The light field display device may create a stereoscopic image by generating a light field using the display module 100 and the 3D optical member 200. As described below, light ray generated from each pixel of the display module 100 of the light field display device may form a light field directed in a specific direction (e.g., a specific viewing angle and/or a specific viewpoint) by a stereoscopic lens, a pinhole, a barrier, or the like, and accordingly, stereoscopic image information corresponding to the specific direction may be provided to the viewer.

The display module 100 may include a display panel 110, a display driving unit 120, and a circuit board.

The display panel 110 may include a display area DA and a non-display area NDA that is adjacent to the display area DA. The display area DA may include data lines, scan lines, voltage supply lines, and a plurality of pixels connected to corresponding data and scan lines. For example, the scan lines may extend in a first direction (e.g., an X-axis direction) and may be spaced apart from each other in a second direction (e.g., a Y-axis direction). The data lines and the voltage supply lines may extend in the second direction (e.g., the Y-axis direction) and may be spaced apart from each other in the first direction (e.g., the X-axis direction).

Each of the pixels may be connected to at least one scan line, data line, and voltage supply line. Each of the pixels may include thin film transistors including a driving transistor and at least one switching transistor, a light emitting element, and a capacitor. Each of the pixels may receive a data voltage of the data line when a scan signal is applied from the scan line, and may emit light by supplying a driving current to the light emitting element according to a data voltage applied to a gate electrode.

The non-display area NDA may at least partially surround the display area DA at an edge of the display panel 110. The non-display area NDA may include a scan driving unit for applying scan signals to the scan lines and pads connected to the display driving unit 120. For example, the display driving unit 120 may be disposed on one side of the non-display area NDA, and the pads may be disposed at an edge of one side of the non-display area NDA on which the display driving unit 120 is disposed.

The display driving unit 120 may output signals and voltages for driving the display panel 110. The display driving unit 120 may supply data voltages to the data lines. The display driving unit 120 may supply a power voltage to the voltage supply line and may supply scan control signals to the scan driving unit. For example, the display driving unit 120 may be formed as an integrated circuit (IC) and be disposed in the non-display area NDA of the display panel 110 in, for example, a chip on glass (COG) manner, a chip on plastic (COP) manner, or an ultrasonic bonding manner. As an example, the display driving unit 120 may be mounted on a circuit board and connected to the pads of the display panel 110.

The display driving unit 120 receives a correction coefficient for each viewing viewpoint from the checking device, and stores the received correction coefficient. The display driving unit 120 sets a viewing viewpoint for each sub-pixel and a viewing viewpoint number according to the viewing viewpoint according to a relative arrangement position of each sub-pixel for each stereoscopic lens 220 of the optical member 200. In addition, the display driving unit 120 aligns an arrangement position for each horizontal line of image data that is input from the outside according to the viewing viewpoint and the viewing viewpoint number of each sub-pixel. Further, the display driving unit 120 corrects the image data for each viewing viewpoint using the correction coefficient for each viewing viewpoint received from the checking device, and generates corrected image data. The display driving unit 120 may display an image according to the relative arrangement positions of the sub-pixels with respect to the stereoscopic lenses 220 by generating data voltages corresponding to the corrected image data and supplying the data voltages to the data lines.

The optical member 200 may be disposed to face a front direction of the display module 100. The optical member 200 may be attached to one surface of the display module 100 through an adhesive member. The optical member 200 may be bonded to the front surface of the display module 100 by a separate panel bonding device. For example, the optical member 200 may be implemented as a lenticular lens sheet including the stereoscopic lenses 220. As an example, the stereoscopic lenses 220 may also be implemented as liquid crystal lenses that form a lens function by controlling a liquid crystal in a liquid crystal layer. When the stereoscopic lenses 220 are implemented as the lenticular lens sheet, the stereoscopic lenses 220 may be disposed on a flat portion 210.

The flat portion 210 may be disposed to face the front direction of the display module 100. For example, the flat portion 210 may be directly disposed on the display module 100. For example, one surface of the flat portion 210, which faces the display module 100, and the other surface of the flat portion 210, which is opposite to the one surface of the flat portion 210, may be parallel to each other. The flat portion 210 may output light incident from the display module 100 as it is. A direction of light passing through one surface of the flat portion 210 may coincide with a direction of light passing through the other surface of the flat portion 210. The flat portion 210 may be formed integrally with the stereoscopic lenses 220, but the present invention is not necessarily limited thereto.

The stereoscopic lenses 220 may be disposed on the flat portion 210 to change an emission direction or traveling direction of emitted light incident from the display module 100 on a rear surface of the flat portion 210 and emitted in a front direction thereof. For example, image display light incident from the display module 100 in a rear direction may pass through the flat portion 210 and reach rear surfaces of the stereoscopic lenses 220.

The stereoscopic lenses 220 may be inclined at a predetermined angle with respect to one side of the display module 100. For example, the stereoscopic lenses 220 may be slanted lenses or half-cylindrical lenses (e.g., semicircular lenses) that are inclined by a predetermined angle with respect to one side of each of the sub-pixels of the display panel 110. Here, the predetermined angle may be designed to prevent a color band of the display device from being visually recognized by the viewer. As an example, the stereoscopic lenses 220 may be implemented as Fresnel lenses. The shape or type of the stereoscopic lenses 220 is not necessarily limited thereto.

For example, the stereoscopic lenses 220 may be manufactured separately from the flat portion 210 and then attached onto the flat portion 210. In addition, the stereoscopic lenses 220 may be formed integrally with the flat portion 210. For example, the stereoscopic lenses 220 may be formed in embossed shapes on an upper surface of the flat portion 210.

Figure 3:
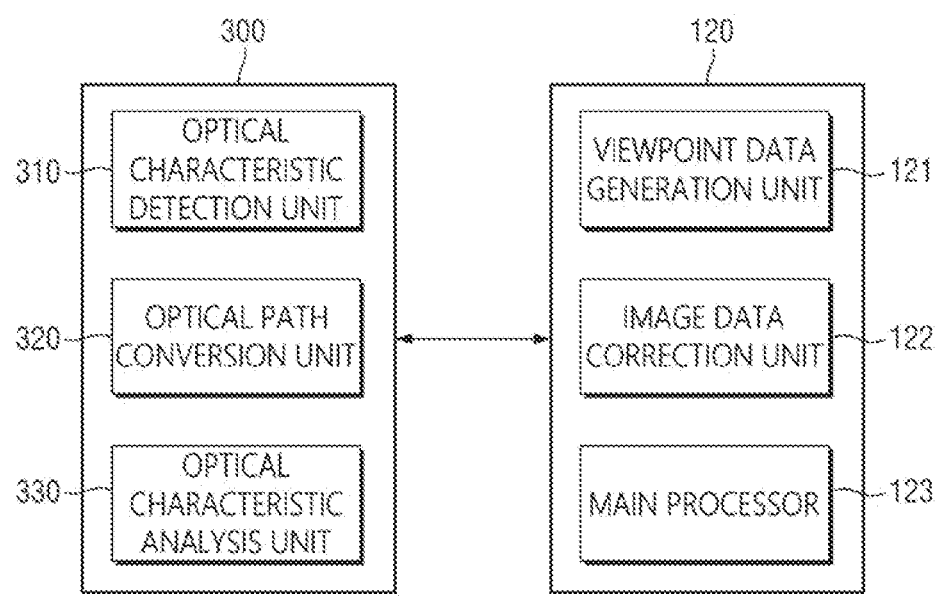
FIG. 3 is a configuration block diagram illustrating a checking system including a display device and a checking device according to an embodiment of the present invention.

FIG. 3 is a configuration block diagram illustrating a checking system including a display device and a checking device according to an embodiment of the present invention.

Referring to FIG. 3, the checking device 300 includes an optical characteristic detection unit 310, an optical path conversion unit 320, and an optical characteristic analysis unit 330.

The display device 290 displays an image by driving the sub-pixels for each viewing viewpoint sequentially for each viewing viewpoint. The viewing viewpoints of the display device 290 may be set according to the relative arrangement positions of the sub-pixels with respect to each of the stereoscopic lenses 220.

For example, the viewing viewpoints of the display device 290 may correspond to or be included in a width of one of the stereoscopic lenses 220, that is, each stereoscopic lens 220 in the thickness direction, and may be set to be equal to the number of sub-pixels disposed on the rear surface of each stereoscopic lens 220. For example, the viewing viewpoints correspond to or are included in a width of the rear surface (or, e.g., a bottom surface or a bottom side) of each stereoscopic lens 220, such that when the number of sub-pixels disposed on the rear surface of each stereoscopic lens 220 is 24, viewing viewpoints for detecting optical characteristics of the display device 290 may be set to 24 viewing viewpoints. In addition, the viewing viewpoints correspond to or are included in the width of the rear surface of each stereoscopic lens 220, such that when the number of sub-pixels disposed on the rear surface of each stereoscopic lens 220 is 12, viewing viewpoints for detecting optical characteristics of the display device 290 may also be set to 12 viewing viewpoints.

The display device 290 displays an image by driving the sub-pixels for each viewing viewpoint sequentially for each viewing viewpoint. For example, when the viewing viewpoints of the display device 290 are set to 24, the display device 290 displays images for each of the 24 viewing viewpoints by sequentially driving sub-pixels divided by the 24 viewing viewpoints for each viewing viewpoint.

The optical path conversion unit 320 modulates an optical path of the display image for each viewing viewpoint by reflecting the display image displayed for each viewing viewpoint in the display device 290.

For example, the optical path conversion unit 320 may reflect the display image for each viewing viewpoint displayed on the display device 290 to the flat reflective panel, and may change the optical path of the display image for each viewing viewpoint of the display device 290 in a direction of the curved reflective panel. In addition, the curved reflective panel secondarily reflects the display image for each viewing viewpoint of the display device 290 that is reflected from the flat reflective panel in a direction of the optical characteristic detection unit 310. For example, the curved reflective panel having a curvature formed in a semicircular concave shape may condense the display image for each viewing viewpoint of the display device 290 according to the concave curvature shape, and reflect and condense the display image in the direction of the optical characteristic detection unit 310.

The curved reflective panel may be formed to maintain a curvature trajectory shape in which a distance from the optical characteristic detection unit 310 is maintained to be the same, and may be formed to maintain a curvature trajectory such as a semicircular shape or a semi-elliptical shape. The optical characteristic detection unit 310 may be disposed at a position of a central point of the curvature trajectory formed by the curved reflective panel so that a constant distance from the curved reflective panel may be maintained.

The optical characteristic detection unit 310 sequentially detects the optical characteristics of the display image for each viewing viewpoint of the display device 290 reflected by the optical path conversion unit 320 to generate and output an optical characteristic detection signal. In other words, the optical characteristic detection unit 310 generates and outputs an optical characteristic detection signal corresponding to a change in optical characteristics for each viewing viewpoint by detecting optical characteristics of any one of luminance, illumination, and/or light quantity of the display image reflected by the optical path conversion unit 320 after being displayed for each viewing viewpoint on the display device 290.

For example, the optical characteristic detection unit 310 is assembled or mounted on the optical path conversion unit 320 to detect the optical characteristics for each viewing viewpoint of the display device 290 that is reflected and condensed through the optical path conversion unit 320. In addition, the optical characteristic detection unit 310 transmits an optical characteristic detection signal corresponding to optical characteristics of any one of luminance, illumination, and/or light quantity to the optical characteristic analysis unit 330.

The optical characteristic analysis unit 330 analyzes the optical characteristic detection signal for each viewing viewpoint output from the optical characteristic detection unit 310 to generate and output a correction coefficient for each viewing viewpoint according to the optical characteristics for each viewing viewpoint.

For example, the optical characteristic analysis unit 330 converts the optical characteristic detection signal for each viewing viewpoint. In addition, the optical characteristic analysis unit 330 compares and analyzes the optical characteristic values for each viewing viewpoint and calculates a correction coefficient for each viewing viewpoint of the display device 290 for each viewing viewpoint. For example, the optical characteristic analysis unit 330 analyzes an average optical characteristic value of the remaining viewing viewpoints that is compared to an optical characteristic value for any one viewing viewpoint. In addition, the optical characteristic analysis unit 330 compares the optical characteristic value for any one viewing viewpoint with the average optical characteristic value of the remaining viewing viewpoints. The optical characteristic analysis unit 330 may extract or calculate a correction coefficient for each viewing viewpoint such that a difference value between the optical characteristic value for each viewing viewpoint and the average optical characteristic value of the remaining viewing viewpoints may be minimized. In this case, the correction coefficient for each viewing viewpoint may be set in an inverse proportion to the difference value between the optical characteristic value for each viewing viewpoint and the average optical characteristic value of the remaining viewing viewpoints. Here, the correction coefficient for each viewing viewpoint may be set in advance according to a plurality of experimental results and a database of calculation results.

An arrangement structure of the display device 290 and the optical path conversion unit 320 and an arrangement structure of the optical characteristic detection unit 310 will be described later in detail with reference to accompanying drawings.

Referring to FIG. 3, the display driving unit 120 of the display device 290 includes a viewpoint data generation unit 121, an image data correction unit 122, and a main processor 123.

The viewpoint data generation unit 121 of the display driving unit 120 aligns image data input from the outside according to an arrangement position of each sub-pixel that is in the vertical and horizontal directions, and sets a viewing viewpoint number according to lens width information and size information for each sub-pixel set in advance for each aligned sub-pixel.

The image data correction unit 122 corrects the image data for each viewing viewpoint by calculating the correction coefficient for each viewing viewpoint that is received from the optical characteristic analysis unit 330 of the checking device 300. In this case, the display driving unit 120 may generate correction image data for each viewing viewpoint by performing an addition operation, a subtraction operation, or a multiplication operation on the image data for each viewing viewpoint with the correction coefficient for each viewing viewpoint.

The main processor 123 generates data voltages that correspond to grayscale values or luminance values of the corrected image data for each viewing viewpoint. In addition, the main processor 123 displays an image according to the relative arrangement positions of sub-pixels with respect to the stereoscopic lenses 220 by supplying the data voltages to the data lines of the display panel 110.

Figure 4:
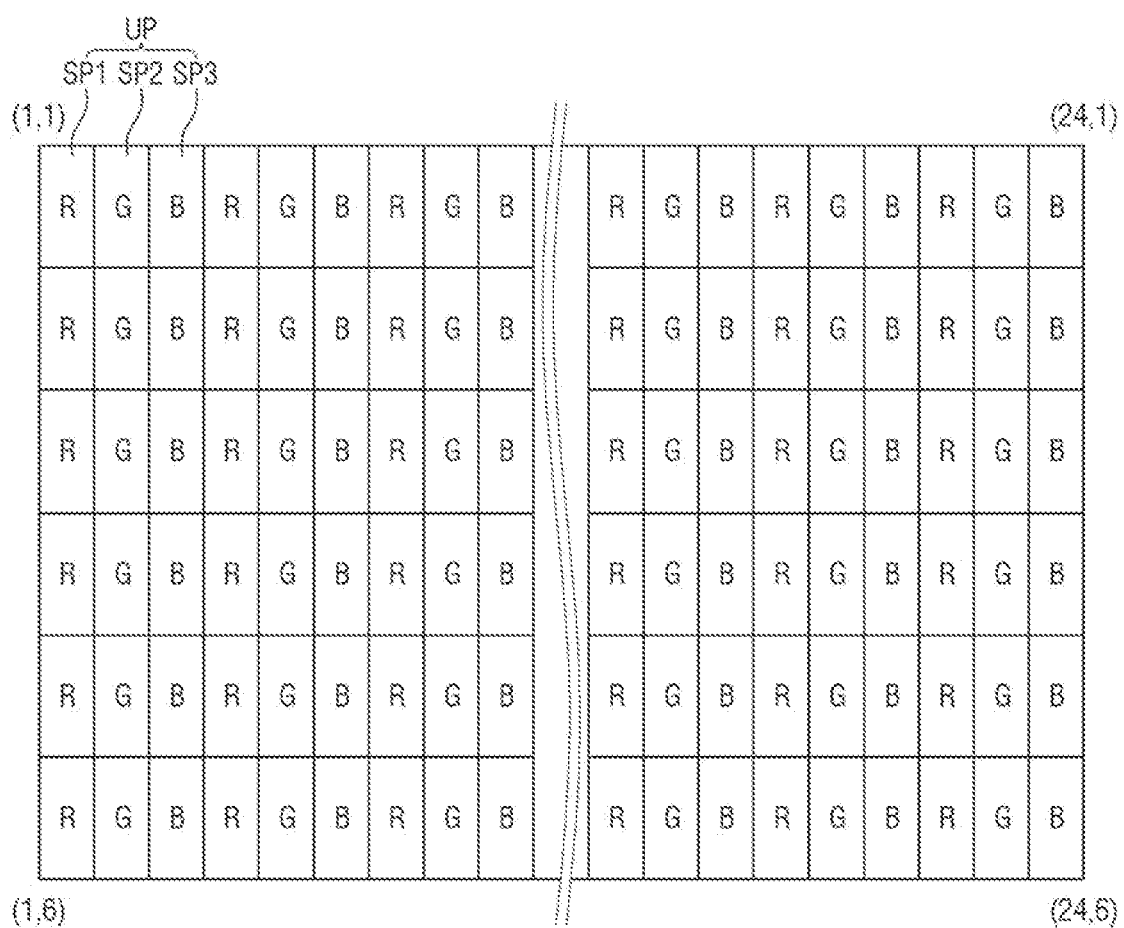
FIG. 4 is a plan view partially illustrating an arrangement structure of sub-pixels in a display area.

FIG. 4 is a plan view partially illustrating an arrangement structure of sub-pixels in a display area.

FIG. 4 illustrates an arrangement structure of sub-pixels arranged in a size of 6×24. Therefore, an arrangement form from the sub-pixels arranged at a 1×1 arrangement position to the sub-pixels arranged at a 6×24 arrangement position is illustrated in FIG. 4.

Referring to FIG. 4, a plurality of unit pixels UP are arranged and formed in the display area DA of the display panel 110, and each unit pixel UP includes a plurality of sub-pixels SP1, SP2, and SP3. Each of the sub-pixels SP1, SP2, and SP3 may be arranged along a plurality of rows and a plurality of columns. For example, the plurality of sub-pixels SP1, SP2, and SP3 may be arranged and formed in a vertical or horizontal stripe structure. For example, the plurality of sub-pixels SP1, SP2, and SP3 may form a matrix arrangement. In this case, the display area DA of the display panel 110 may include more unit pixels UP as a resolution of the display device 290 increases.

For example, each of the unit pixels UP may include first to third sub-pixels SP1, SP2, and SP3 displaying different colors from each other. The first to third sub-pixels SP1, SP2, and SP3 may be provided by crossing n data lines (n is a natural number) and m scan lines (m is a natural number). Each of the plurality of sub-pixels SP1, SP2, and SP3 may include a light emitting element and a pixel circuit. The pixel circuit may include a driving transistor, at least one switching transistor, and at least one capacitor to drive the light emitting element of each of the plurality of sub-pixels SP1, SP2, and SP3.

Each of the plurality of unit pixels UP may include one first sub-pixel SP1, one second sub-pixel SP2, and one third sub-pixel SP3. However, the present invention is not limited thereto, and for example, each of the plurality of unit pixels UP may include a total of four sub-pixels including one first sub-pixel SP1, two second sub-pixels SP2, and one third sub-pixel SP3. The number of sub-pixels included in each unit pixel UP is not necessarily limited thereto. In addition, the first sub-pixel SP1 may be a red sub-pixel. The second sub-pixel SP2 may be a green sub-pixel, and the third sub-pixel SP3 may be a blue sub-pixel. Each of the first to third sub-pixels SP1, SP2, and SP3 may receive a data signal including luminance information of red, green, or blue light from the display driving unit 120 and output light of a corresponding color.

Figure 5:
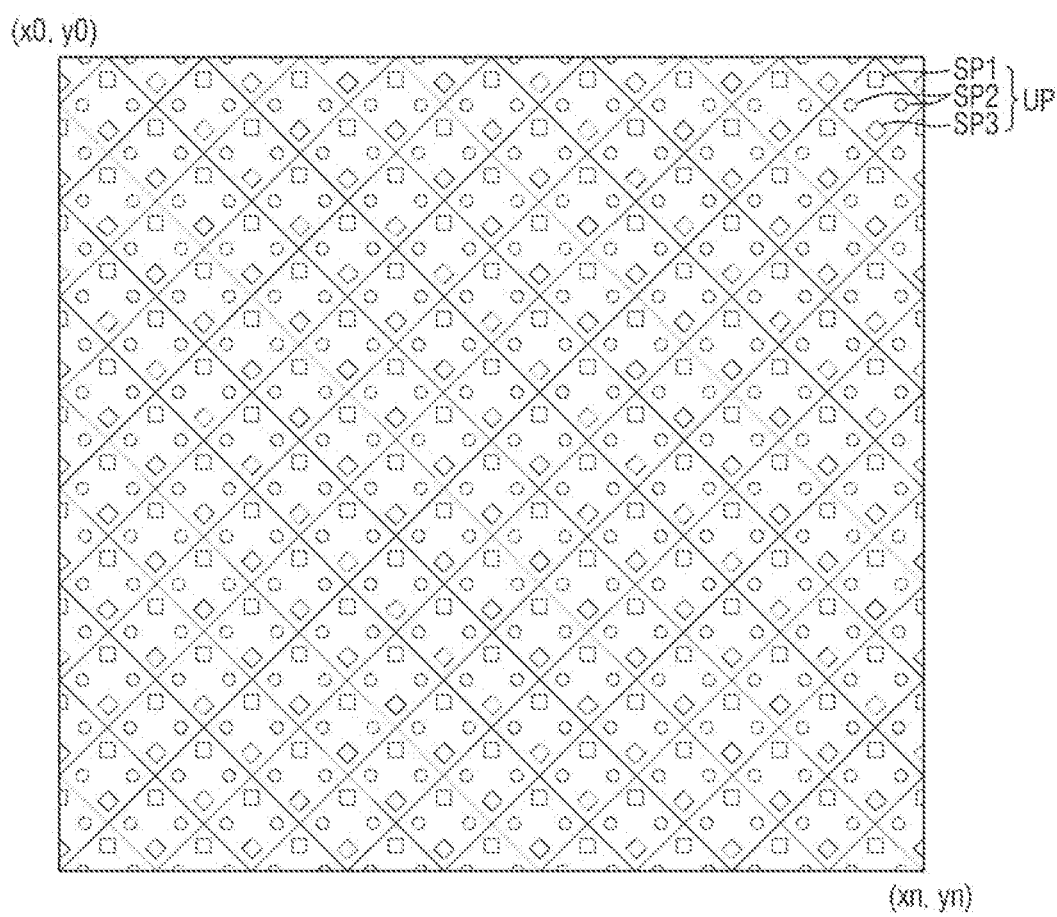
FIG. 5 is a plan view of partially illustrating an arrangement structure of sub-pixels in a display area.

FIG. 5 is a plan view of an example partially illustrating an arrangement structure of sub-pixels in a display area.

Referring to FIG. 5, a plurality of unit pixels UP and a plurality of sub-pixels SP1, SP2, and SP3 may be arranged in a Pentile™ matrix form. For example, each of the plurality of unit pixels UP may include first to third sub-pixels SP1, SP2, and SP3 arranged in the Pentile™ matrix form. The plurality of first to third sub-pixels SP1, SP2, and SP3 may be provided by crossing n data lines (n is a natural number) and m scan lines (m is a natural number).

Each of the plurality of unit pixels UP may include one first sub-pixel SP1, two second sub-pixels SP2, and one third sub-pixel SP3, but the present invention is not necessarily limited thereto. Here, the first sub-pixel SP1 may be a red sub-pixel, and the second sub-pixel SP2 may be a green sub-pixel. Further, the third sub-pixel SP3 may be a blue sub-pixel. A size of an opening area of each of the first to third sub-pixels SP1, SP2, and SP3 may be determined according to luminance of corresponding light. Therefore, the size of the opening area of each of the first to third sub-pixels SP1, SP2, and SP3 may be adjusted to implement white light by mixing light emitted from each of a plurality of light emitting layers of the first to third sub-pixels SP1, SP2, and SP3. Each of the first to third sub-pixels SP1, SP2, and SP3 may receive a data signal including luminance information of red, green, or blue light from the display driving unit 120 and may output light of a corresponding color.

Figure 6:
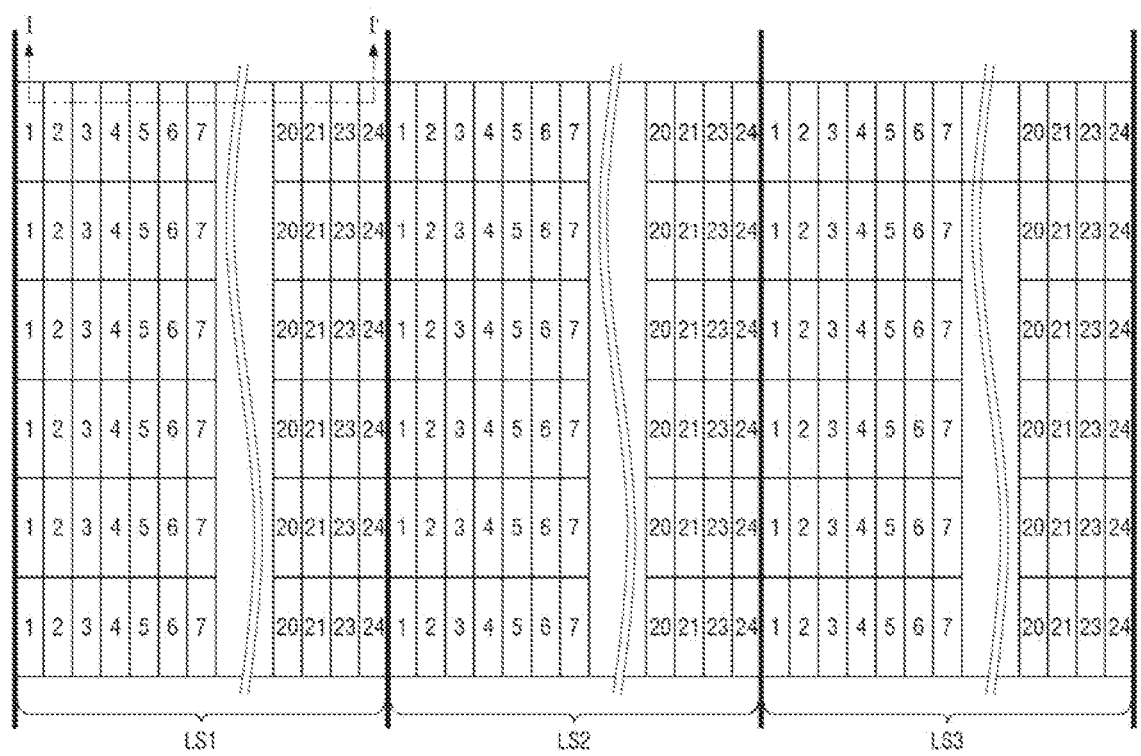
FIG. 6 is a view illustrating a method of setting viewing viewpoint information for each sub-pixel according to a lens width of an optical member.

FIG. 6 is a view illustrating a method of setting viewing viewpoint information for each sub-pixel according to a lens width of an optical member.

Referring to FIG. 6, viewing viewpoint information and viewing viewpoint number for each sub-pixel are set in order according to relative arrangement positions of the sub-pixels SP1. SP2, and SP3 that are overlapping the stereoscopic lenses LS1, LS2, and LS3, respectively, according to information such as a width and a slanted angle of each of the individual stereoscopic lenses LS1, LS2, and LS3.

As an example, the viewing viewpoint information and viewpoint number according to the relative arrangement positions of the sub-pixels SP1, SP2, and SP3, which are overlapping the stereoscopic lenses LS1, LS2, and LS3, respectively, are repeatedly set in a width direction of each of the stereoscopic lenses LS1, LS2, and LS3 or an X-axis direction. This may be expressed as in Equation 1 below.

$$\text{Viewing Viewpoint Information (or Viewpoint Number)} = \text{rows} \times \text{pixelsize} \times \tan(\text{slanted angle}) \quad \text{[Equation 1]}$$

Here, rows is the order in a horizontal line direction, and pixel size is a width or size of each sub-pixel. In addition, tan(slanted angle) is a slant angle (tθ), but since the lenses are arranged side by side in a Y-axis direction (or a vertical direction) in the present embodiment, tan(slanted angle) becomes 1.

Viewing viewpoint information (or viewpoint numbers) of sub-pixels arranged on a first horizontal line and viewing viewpoint information from a second horizontal line to the last horizontal line are the same in the Y-axis direction (or vertical direction).

Figure 7:
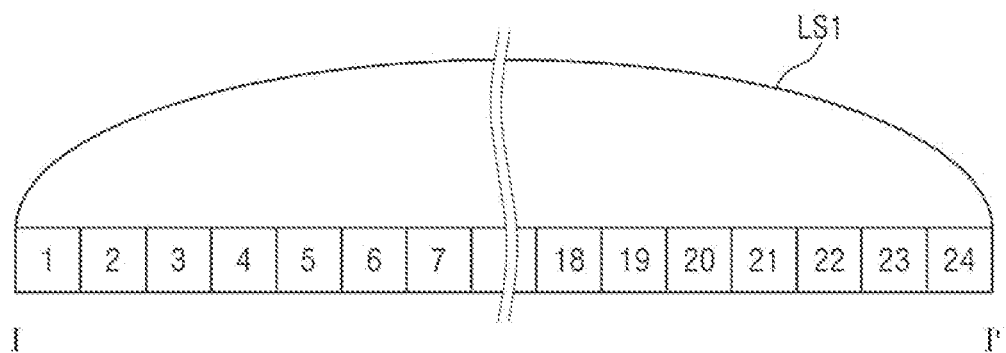
FIG. 7 is a view illustrating a method of setting viewing viewpoint information for each sub-pixel according to a lens width and a curvature.

FIG. 7 is a view illustrating a method of setting viewing viewpoint information for each sub-pixel according to a lens width and a curvature of the lens.

As illustrated in FIG. 7, viewing viewpoint information for each of the sub-pixels SP1, SP2, and SP3 is set according to the relative arrangement positions of the sub-pixels SP1, SP2, and SP3 with respect to each of the stereoscopic lenses LS1, LS2, and LS3, and image display viewpoints or viewing viewpoints of the display device 290 are set according to the viewing viewpoint information and viewpoint number of each of the sub-pixels SP1, SP2, and SP3.

Therefore, the image display viewpoints or viewing viewpoints of the display device 290 may correspond to or be included in the width of each of the stereoscopic lenses LS1, LS2, and LS3, and may be set to be equal to the number and viewpoint number of sub-pixels disposed on a rear surface of each of the stereoscopic lenses LS1, LS2, and LS3.

As illustrated in FIG. 7, the image display viewpoints or viewing viewpoints of the display device 290 correspond to or are included in a width of the rear surface (or, e.g., bottom surface or bottom side) of each of the stereoscopic lenses LS1, LS2, and LS3, such that when the number of sub-pixels disposed on the rear surface of each of the stereoscopic lenses LS1, LS2, and LS3 is 24, viewing viewpoints for detecting optical characteristics of the display device 290 may be set to 24 viewing viewpoints.

Figure 8:
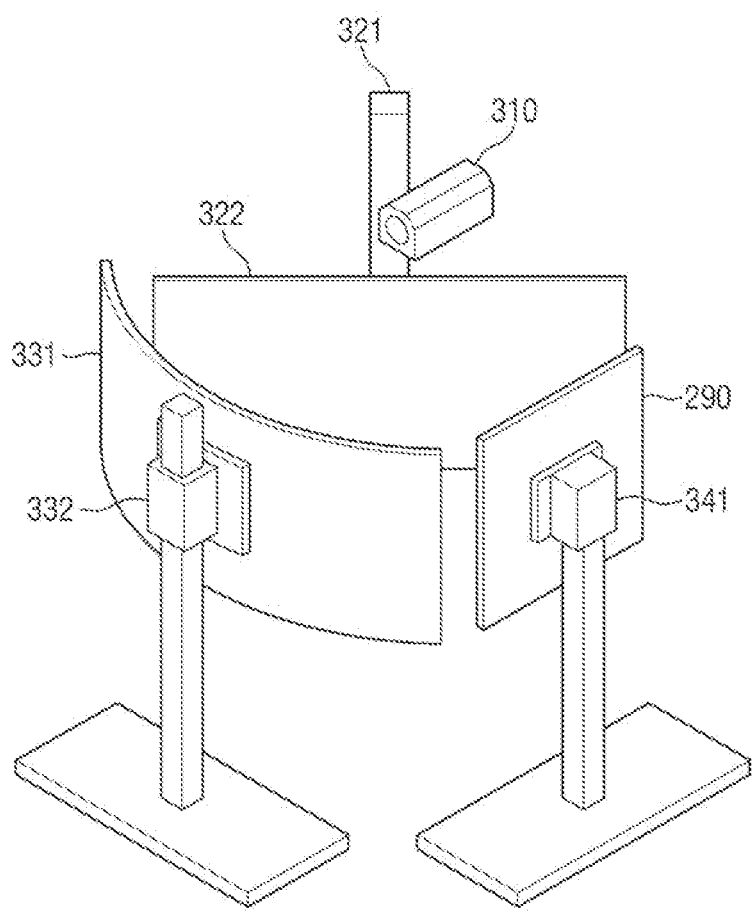
FIG. 8 is a side perspective view illustrating an arrangement structure of a display device and a checking device according to an embodiment of the present invention.

FIG. 8 is a side perspective view illustrating an arrangement structure of a display device and a checking device according to an embodiment of the present inventive concept.

Referring to FIG. 8, the optical path conversion unit 320 includes a flat reflective panel 322, a curved reflective panel 331, a first position adjustment module 341, a second position adjustment module 321, and a third position adjustment module 332.

The first position adjustment module 341 fixes the display device 290 by adjusting an arrangement position and horizontal and vertical axis angles of the display device 290 so that the display device 290 is disposed facing the flat reflective panel 322. The display device 290 fixed to the first position adjustment module 341 displays an image for each viewing viewpoint sequentially. For example, the first position adjustment module 341 may include a rod shaped portion and an annular shaped portion that is attached to the rod shaped portion and the display device 290 and that is configured to move along the rod shaped portion. In addition, the first position adjustment module 341 may include a joint that enables movement of the display device 290 in a plurality of directions.

The second position adjustment module 321 fixes the flat reflective panel 322 by adjusting an arrangement position and horizontal and vertical axis angles of the flat reflective panel 322 so that the display images for each viewing viewpoint displayed on the display device 290 are reflected and refracted by the flat reflective panel 322. For example, the second position adjustment module 321 may include a rod shaped portion and an annular shaped portion that is attached to the rod shaped portion and the flat reflective panel 322 and that is configured to move along the rod shaped portion. In addition, the second position adjustment module 321 may include a joint that enables movement of the flat reflective panel 322 in a plurality of directions.

The flat reflective panel 322, which is fixed by the second position adjustment module 321, reflects and refracts the display images sequentially emitted from the display device 290 for each viewing viewpoint, thereby changing optical paths of the display images for each viewing viewpoint in a direction of the curved reflective panel 331.

The flat reflective panel 322 may be disposed at a position where lengths of optical paths for each viewing viewpoint that are displayed on the display device 290 to be primarily reflected from the flat reflective panel 322, and are secondly reflected from the curved reflective panel 331 to be incident to the optical characteristic detection unit 310 are all the same.

In other words, the second position adjustment module 321 fixes the flat reflective panel 322 by adjusting the position of the flat reflective panel 322 so that the lengths of the optical paths for each viewing viewpoint, which are displayed on the display device 290 to be sequentially reflected from the flat reflective panel 322 and the curved reflective panel 331 and are incident to the optical characteristic detection unit 310, are all the same.

The third position adjustment module 332 fixes the curved reflective panel 331 by adjusting an arrangement position and horizontal and vertical axis angles of the curved reflective panel 331 so that the display images for each viewing viewpoint, which are primarily reflected and refracted by the flat reflective panel 322, are secondarily reflected and refracted in the direction of the optical characteristic detection unit 310 by the curved reflective panel 331. In this case, the third position adjustment module 332 fixes the curved reflective panel 331 by adjusting the arrangement position and the horizontal and vertical axis angles of the curved reflective panel 331 so that the displayed images for each viewing viewpoint, which are secondarily reflected and refracted by the curved reflective panel 331, may be condensed toward the optical characteristic detection unit 310. For example, the third position adjustment module 332 may include a rod shaped portion and an annular shaped portion that is attached to the rod shaped portion and the curved reflective panel 331 and that is configured to move along the rod shaped portion. In addition, the third position adjustment module 332 may include a joint that enables movement of the curved reflective panel 331 in a plurality of directions.

The curved reflective panel 331 may condense the optical paths of the display images for each viewing viewpoint in an arrangement direction of the optical characteristic detection unit 310 by secondarily reflecting and refracting the display images for each viewing viewpoint, which are primarily reflected by the flat reflective panel 322.

The curved reflective panel 331 has a curvature formed in a semicircular concave shape so that the optical paths of the display images for each viewing viewpoint may be condensed in the arrangement direction of the optical characteristic detection unit 310. The curved reflective panel 331 may reflect and condense the display image for each viewing viewpoint of the display device 290 in the direction of the optical characteristic detection unit 310 according to the concave curvature shape of the curved reflective panel 331.

The curved reflective panel 331 may be formed in a curvature trajectory shape so that an inner surface forming the curvature maintains the same distance from the optical characteristic detection unit 310, and may be formed to maintain a curvature trajectory. For example, the curved reflective panel 331 may have a semicircular shape or a semi-elliptical shape.

The optical characteristic detection unit 310 may be disposed at a position of a central point of the curvature trajectory formed by the curved reflective panel such that a constant distance from the curved reflective panel may be maintained.

The optical characteristic detection unit 310 may be assembled to the first or second position adjustment module 341 or 321 to generate and output an optical characteristic detection signal for each viewing viewpoint according to a change in optical characteristics of the display images for each viewing viewpoint condensed by the curved reflective panel 331. As an example, the optical characteristic detection unit 310 may be assembled and disposed in the second position adjustment module 321, which is disposed in a direction facing the curved reflective panel 331, to detect a change in optical characteristics of the displayed images for each viewing viewpoint condensed by the curved reflective panel 331. In addition, the optical characteristic detection unit 310 may be disposed in the direction facing the curved reflective panel 331 to be directed to the central point of the curved reflective panel 331. The optical characteristic detection unit 310 may be disposed to be slanted at a predetermined slant to be directed to the central point of the curved reflective panel 331, and as the slant of the optical characteristic detection unit 310 directed to the central point of the curved reflective panel 331 is minimized, optical characteristic detection accuracy may be increased.

Figure 9:
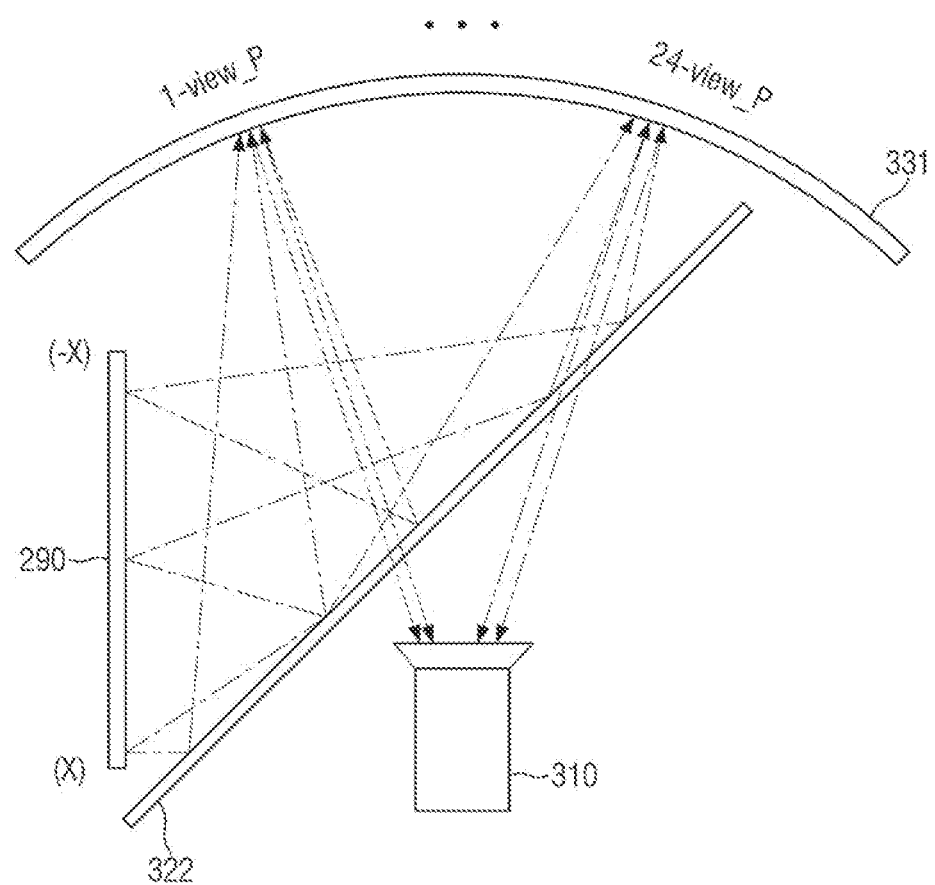
FIG. 9 is a view illustrating a method of detecting an occurrence size of a crosstalk phenomenon for each viewing viewpoint of a display device using the checking device of FIG. 8.

FIG. 9 is a view illustrating a method of detecting an occurrence size of a crosstalk phenomenon for each viewing time point of a display device using the checking device of FIG. 8. In addition, FIG. 10 is a view illustrating a light emitting order of sub-pixels for each viewing viewpoint of the display device illustrated in FIG. 9.

Figure 10:
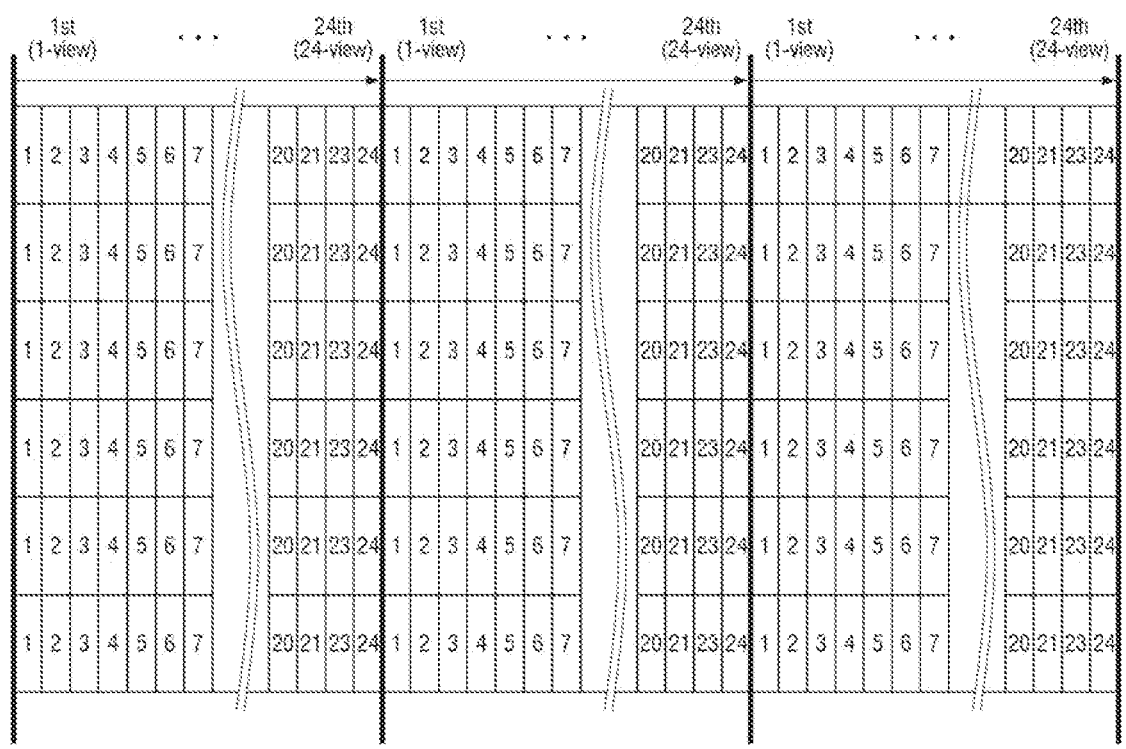
FIG. 10 is a view illustrating a light emitting order of sub-pixels for each viewing viewpoint of the display device illustrated in FIG. 9.

Referring to FIGS. 9 and 10, the display device 290 is disposed in the direction facing the flat reflective panel 322 by the first position adjustment module 341, and sequentially displays an image for each viewing viewpoint towards the flat reflective panel 322.

The display driving unit 120 of the display device 290 supplies image voltages to corresponding sub-pixels so that the image is displayed on sub-pixels having the same viewing viewpoint number as each viewing viewpoint for each viewing viewpoint during an optical characteristic detection period for each viewing viewpoint.

For example, the display driving unit 120 supplies the image voltage to sub-pixels for which first viewing viewpoint information is set so that the image is displayed on the sub-pixels for which the first viewing viewpoint information (or a first viewing viewpoint number) among all the sub-pixels of the display area DA is set. Therefore, a display image ($1^{st}$(1-view)) of the first viewing viewpoint is displayed first and is primarily reflected and refracted by the flat reflective panel 322.

The display image ($1^{st}$(1-view)) of the first viewing viewpoint is emitted at an angle slanted in one side direction (e.g., the X direction X) of the display device 290 disposed according to a sub-pixel column arrangement direction of the first viewing viewpoint. Therefore, when the display image ($1^{st}$(1-view)) of the first viewing viewpoint, which is emitted to be slanted in one side direction, is primarily reflected and refracted by the flat reflective panel 322, the display image ($1^{st}$(1-view)) of the first viewing viewpoint is reflected to be adjacent to one side direction (e.g., a direction of a first reflection viewing viewpoint 1-view_P) of the curved reflective panel 331.

The display image ($1^{st}$(1-view)) of the first viewing viewpoint is secondarily reflected and refracted in one side direction (e.g., the direction of the first reflection viewing viewpoint 1-view_P) of the curved reflective panel 331, and is condensed into the optical characteristic detection unit 310.

The optical characteristic detection unit 310 detects optical characteristics of the display image ($1^{st}$(1-view)) of the first viewing viewpoint, which is firstly displayed on the display device 290 and is condensed through the curved reflective panel 331. In addition, the optical characteristic detection unit 310 generates an optical characteristic detection signal.

As illustrated in FIG. 10, the display driving unit 120 drives the respective sub-pixels so that the images ($1^{st}$(1-view) to $24^{th}$(24-view)) for each viewing viewpoint are displayed in order of starting from the sub-pixels for which the first viewing viewpoint information is set, to the last sub-pixels for which twenty-fourth viewing viewpoint information is set.

The display image ($24^{th}$(24-view)) of the last twenty-fourth viewing viewpoint is secondarily reflected and refracted in the other side direction (e.g., a direction of a twenty-fourth reflection viewing viewpoint 24-view_P) of the curved reflective panel 331, and is condensed into the optical characteristic detection unit 310.

The optical characteristic detection unit 310 sequentially detects a change in optical characteristics of the images ($1^{st}$(1-view) to $24^{th}$(24-view)) for each viewing viewpoint that is condensed by the curved reflective panel 331, and generates and outputs an optical characteristic detection signal for each viewing viewpoint.

Figure 11:
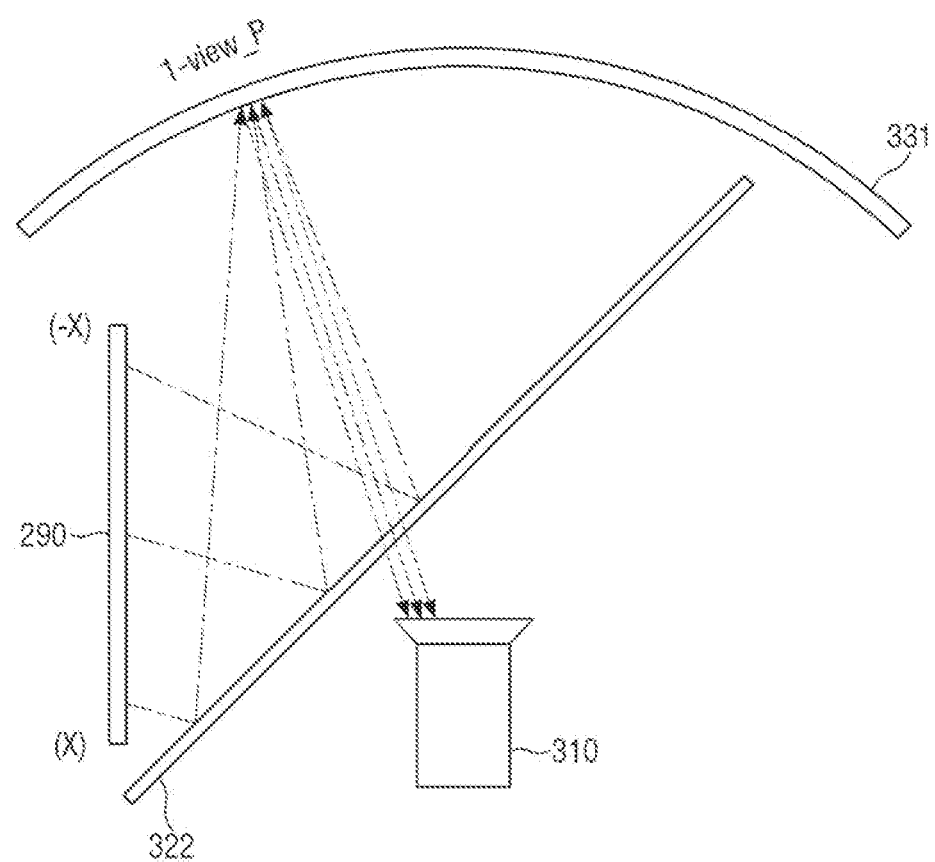
FIG. 11 is a view illustrating a method of detecting an occurrence size of a crosstalk phenomenon at a first viewing viewpoint for the display device.

FIG. 11 is a view illustrating a method of detecting an occurrence size of a crosstalk phenomenon at a first viewing viewpoint for the display device.

Referring to FIG. 11, when the display image (1$(1-view)) of the first viewing viewpoint is first displayed on the sub-pixels for which the first viewing viewpoint information is set among all the sub-pixels of the display area DA, the display image ($1^{st}$(1-view)) of the first viewing viewpoint is emitted at an angle slanted in one side direction (e.g., the X direction X) according to the sub-pixel column arrangement direction of the first viewing viewpoint that is biased in one side direction (e.g., the X direction X) of the display device 290.

When the display image ($1^{st}$(1-view)) of the first viewing viewpoint, which is emitted at the angle that is slanted in one side direction, is primarily reflected and refracted by the flat reflective panel 322, the display image ($1^{st}$(1-view)) of the first viewing viewpoint is incident in a direction adjacent to one side direction (e.g., the direction of the first reflection viewing viewpoint 1-view_P) of the curved reflective panel 331.

The curved reflective panel 331 secondarily reflects and refracts light of the display image that is incident in the direction of the first reflection viewing viewpoint 1-view_P so that the light is condensed into the optical characteristic detection unit 310 according to a curvature shape thereof.

The display image ($1^{st}$(1-view)) of the first viewing viewpoint is secondarily reflected and refracted in one side direction (e.g., the direction of the first reflection viewing viewpoint 1-view_P) of the curved reflective panel 331, and is condensed into the optical characteristic detection unit 310.

Figure 12:
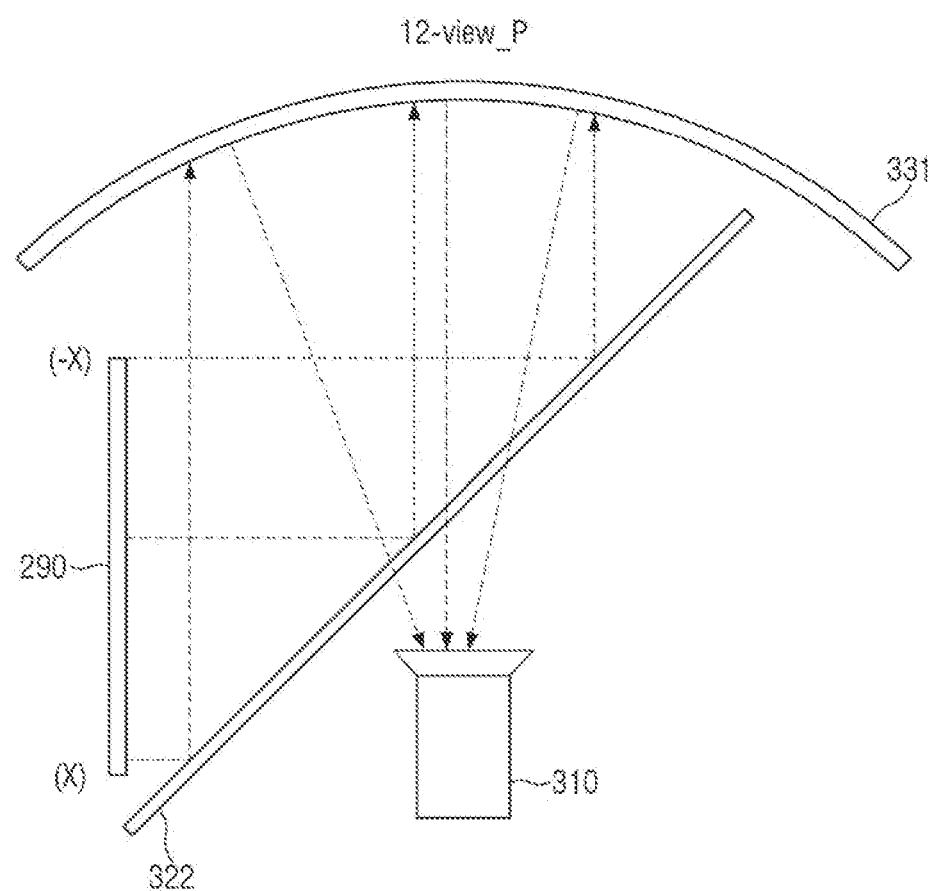
FIG. 12 is a view illustrating a method of detecting an occurrence size of a crosstalk phenomenon at a twelfth viewing viewpoint for the display device.

FIG. 12 is a view illustrating a method of detecting an occurrence size of a crosstalk phenomenon at a twelfth viewing viewpoint for the display device.

Referring to FIG. 12, when the sub-pixels sequentially emit light, which is according to the viewing viewpoint information, and a display image ($12^{th}$(12-view)) of the twelfth viewing viewpoint is displayed on the sub-pixels for which twelfth viewing viewpoint information is set, the display image ($12^{th}$(12-view)) of the twelfth viewing viewpoint is emitted in a front direction of the display device 290.

When the display image ($12^{th}$(12-view)) of the twelfth viewing viewpoint, which is emitted in the front direction of the display device 290, is primarily reflected and refracted by the flat reflective panel 322, the display image ($12^{th}$(12-view)) of the twelfth viewing viewpoint may be incident on the front of the curved reflective panel 331.

The curved reflective panel 331 secondarily reflects and refracts light of the display image that is incident from the front direction centered on a direction of a twelfth reflective viewing viewpoint 12-view_P so that the light is condensed into the optical characteristic detection unit 310 according to a curvature shape of the curved reflective panel 331.

The display image ($12^{th}$(12-view)) of the twelfth viewing viewpoint is secondarily reflected and refracted in the front direction of the curved reflective panel 331, and is condensed into the optical characteristic detection unit 310 according to the curvature shape and reflection angle of the curved reflective panel 331.

Figure 13:
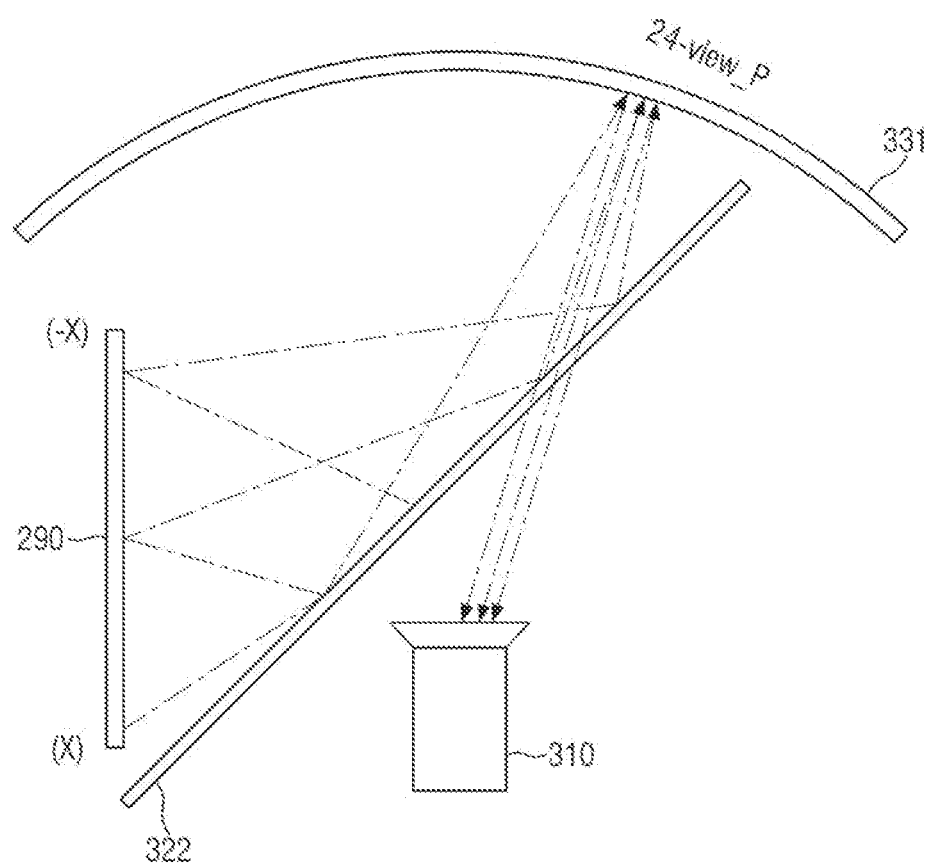
FIG. 13 is a view illustrating a method of detecting an occurrence size of a crosstalk phenomenon at a twenty-fourth viewing viewpoint for the display device.

FIG. 13 is a view illustrating a method of detecting an occurrence size of a crosstalk phenomenon at a twenty-fourth viewing viewpoint for the display device.

Referring to FIG. 13, when the sub-pixels sequentially emit light, which is according to the viewing viewpoint information, and a display image ($24^{th}$(24-view)) of a twenty-fourth viewing viewpoint is displayed on the sub-pixels for which twenty-fourth viewing viewpoint information is set, the display image ($24^{th}$(24-view)) of the twenty-fourth viewing viewpoint is emitted at an angle slanted in the other side direction (e.g., a −X direction −X) according to the sub-pixel column arrangement direction of the twenty-fourth viewing viewpoint that is biased in the other side direction (e.g., the −X direction −X) of the display device 290.

When the display image ($24^{th}$(24-view)) of the twenty-fourth viewing viewpoint, which is emitted at the angle slanted in the other side direction, is primarily reflected and refracted by the flat reflective panel 322, the display image ($24^{th}$(24-view)) of the twenty-fourth viewing viewpoint is incident in a direction adjacent to the other side direction (e.g., the direction of the twenty-fourth reflection viewing viewpoint 24-view_P) of the curved reflective panel 331.

The curved reflective panel 331 secondarily reflects and refracts light of the display image that is incident to be biased centered on the twenty-fourth reflection viewing viewpoint 24-view_P so that the light is condensed into the optical characteristic detection unit 310 according to a curvature shape of the curved reflective panel 331.

The display image ($24^{th}$(24-view)) of the twenty-fourth viewing viewpoint is secondarily reflected and refracted in the other side direction (e.g., the direction of the twenty-fourth reflection viewing viewpoint 24-view_P) of the curved reflective panel 331, and is condensed into the optical characteristic detection unit 310.

FIG. 14 is a table illustrating detection results of luminance values for each viewing viewpoint according to an embodiment of the present invention.

Referring to FIG. 14, the optical characteristic analysis unit 330 converts the optical characteristic detection signal for each viewing viewpoint that is output from the optical characteristic detection unit 310 into a digital signal, compares and analyzes optical characteristic values for each viewing viewpoint, and calculates a correction coefficient for each viewing viewpoint of the display device 290 for each viewing viewpoint. In this case, the optical characteristic analysis unit 330 may compare and analyze luminance characteristic values (or luminance values) of the remaining viewing viewpoints that are compared to a luminance characteristic value (or a luminance value) for any one viewing viewpoint.

For example, the optical characteristic analysis unit 330 compares and analyzes a difference value between the luminance characteristic value for any one viewing viewpoint and an average luminance characteristic value of the remaining viewing viewpoints. In addition, the optical characteristic analysis unit 330 may extract a correction coefficient for each viewing viewpoint from a memory or a register so that the difference value between the luminance characteristic value for each viewing viewpoint and the average luminance characteristic value of the remaining viewing viewpoints may be minimized.

In this case, the correction coefficient for each viewing viewpoint may be set as an inverse proportion to the difference value between the luminance characteristic value for each viewing viewpoint and the average luminance characteristic value of the remaining viewing viewpoints.

Figure 15:
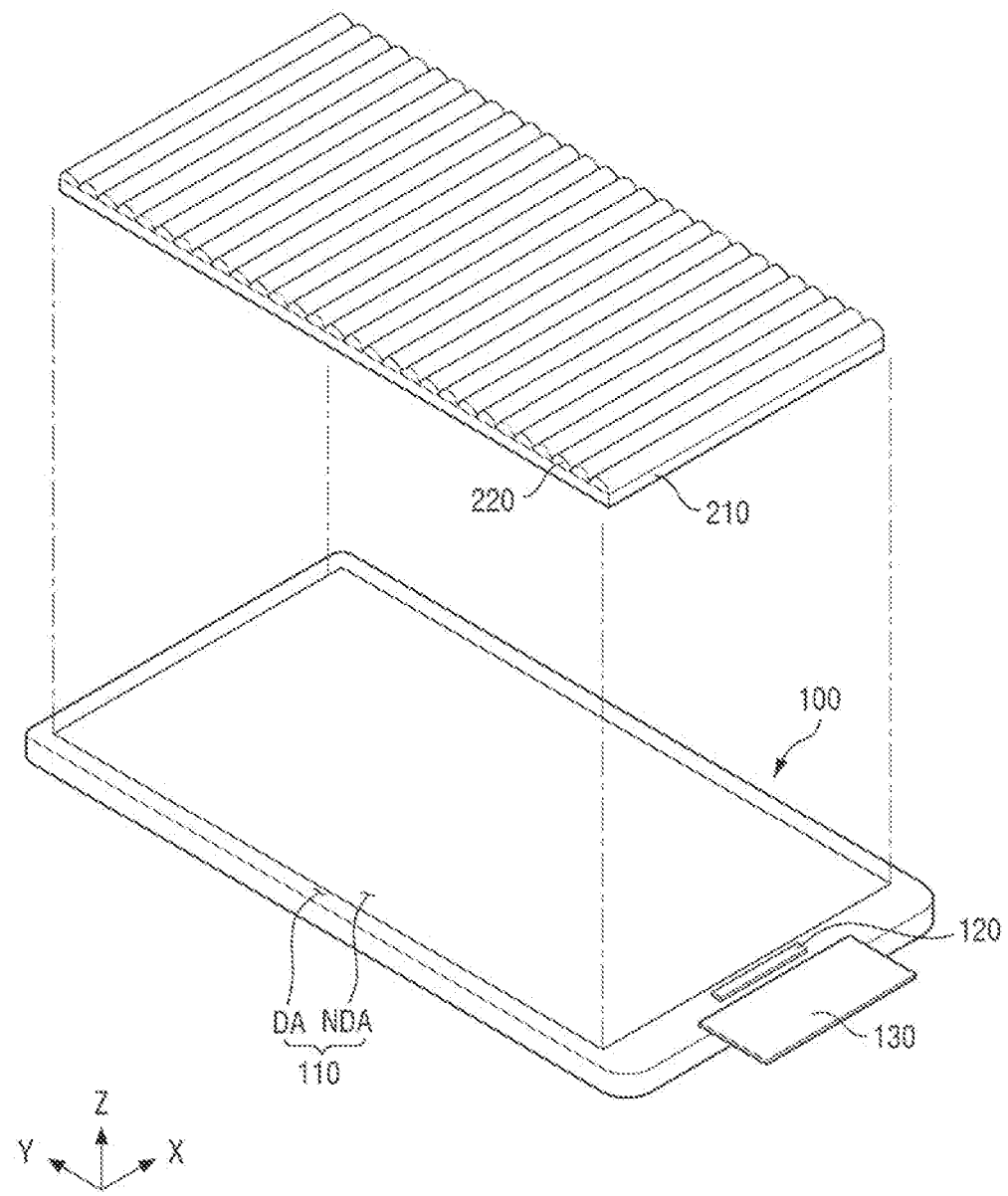
FIG. 15 is an exploded perspective view illustrating a display device according to an embodiment of the present invention.

FIG. 15 is an exploded perspective view illustrating a display device according to an embodiment of the present invention. In addition, FIG. 16 is a plan view configuration diagram illustrating a display panel and an optical member illustrated in FIG. 15.

Figure 16:
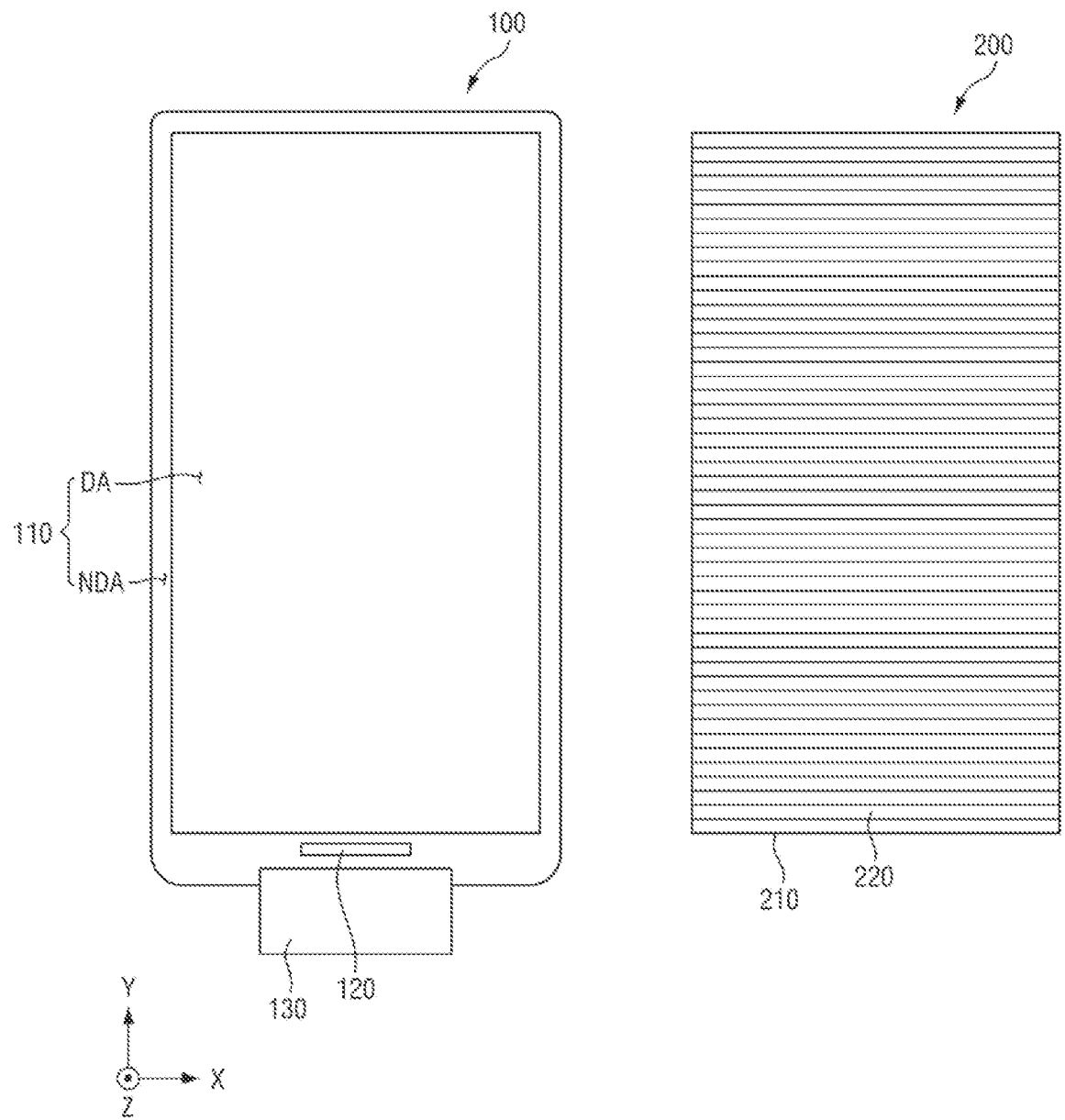
FIG. 16 is a plan view configuration diagram illustrating a display panel and an optical member illustrated in FIG. 15.

Referring to FIGS. 15 and 16, a display device 290 according to an embodiment of the present invention may be implemented as a flat panel display device such as an organic light emitting display (OLED), and may be a stereoscopic image display device including a display module 100 and an optical member 200.

The display module 100 may include a display panel 110, a display driving unit 120, and a circuit board 130.

The display panel 110 may include a display area DA and a non-display area NDA. The display area DA may include data lines, scan lines, voltage supply lines, and a plurality of pixels connected to corresponding data and scan lines.

The optical member 200 may be disposed on the display module 100. The optical member 200 may be attached to one surface of the display module 100 through an adhesive member. The optical member 200 may be bonded to the display module 100 by a panel bonding device. For example, the optical member 200 may be implemented as a lenticular lens sheet including a plurality stereoscopic lenses LS1 to LS3.

Figure 17:
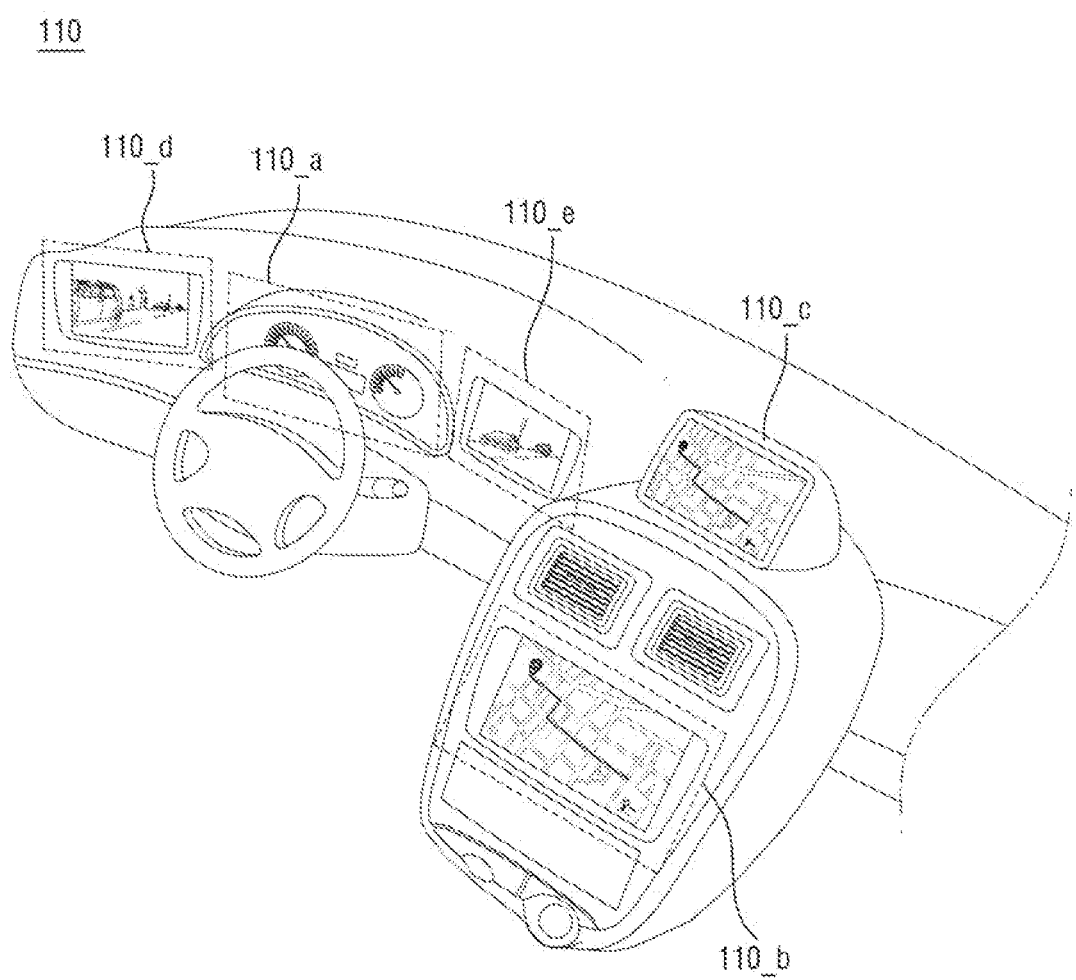
FIG. 17 is a view illustrating an instrument board and a center fascia of a vehicle including the display device according to an embodiment of the present invention.

FIG. 17 is a view illustrating an instrument board and a center fascia of a vehicle including the display device according to an embodiment of the present invention.

Referring to FIG. 17, the display device in which the display module 100 and the optical member 200 are bonded to each other according to an embodiment of the present invention may be applied to an instrument panel 110_a of a vehicle, a center fascia 110_b of the vehicle, or a center information display (CID) 110_c disposed on a dashboard of the vehicle. In addition, the display device according to an embodiment of the present invention may also be applied to a room mirror display (110_d and 110_e) replacing a side mirror of a vehicle, a navigation device, and the like.

Figure 18:
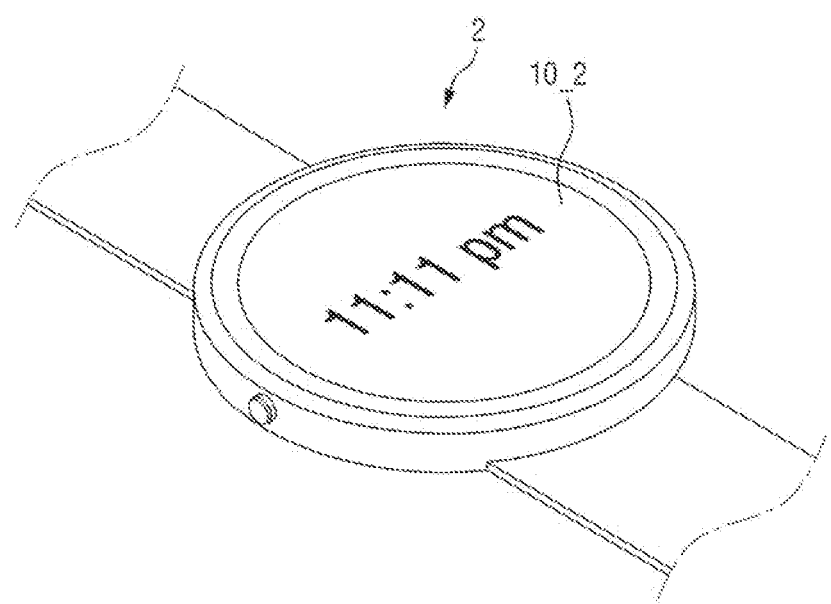
FIG. 18 is a view illustrating a watch-type smart device including the display device according to an embodiment of the present invention.

FIG. 18 is a view illustrating a watch-type smart device including the display device according to an embodiment of the present inventive concept. In addition, FIG. 19 is a view illustrating a glasses-type virtual reality device including the display device according to an embodiment.

FIG. 18 illustrates a watch-type smart device 2 that includes a display device 10_2. For example, the display device 10_2 may include the display module 100 and the optical member 200 that are bonded to each other.

Figure 19:
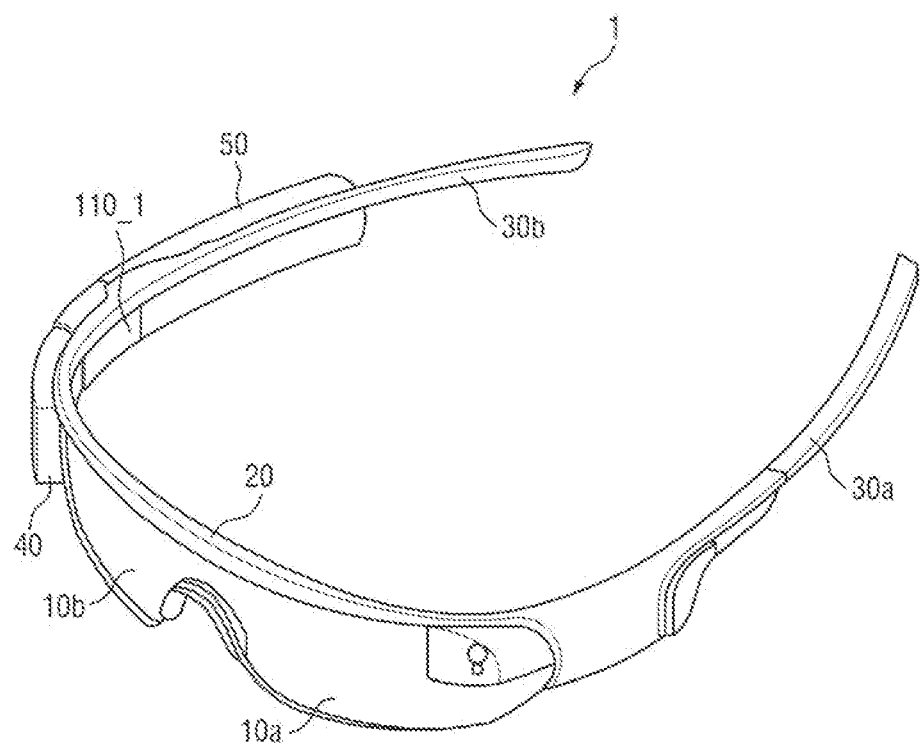
FIG. 19 is a view illustrating a glasses-type virtual reality device including the display device according to an embodiment of the present invention.

FIG. 19 illustrates a glasses-type virtual reality device 1 including glasses frame legs 30a and 30b. The glasses-type virtual reality device 1 according to an embodiment of the present invention may include a display device 110_1, a left eye lens 10a, a right eye lens 10b, a support frame 20, glasses frame legs 30a and 30b, a reflective member 40, and a display device accommodating portion 50.

The glasses-type virtual reality device 1 according to an embodiment of the present invention may also be applied to a head mounted display including a head mounted band that may be mounted on a head of a user instead of using the glasses frame legs 30a and 30b. For example, the glasses-type virtual reality device 1 according to an embodiment of the present invention is not limited to that illustrated in FIG. 19, and may be applied in various forms in various other electronic devices.

The display device accommodating portion 50 may include a display device 110_1 such as a micro LED display device and a reflective member 40. An image displayed on the display device 110_1 may be reflected by the reflective member 40 and may be provided to a user's right eye through the right eye lens 10b. Accordingly, a user may view a virtual reality image displayed on the display device through the right eye.

Although FIG. 19 illustrates that the display device accommodating portion 50 is disposed at a right distal end of the support frame 20, an embodiment of the present invention is not limited thereto. For example, the display device accommodating portion 50 may be disposed at a left distal end of the support frame 20. In this case, an image displayed on the display device 110_1 may be reflected by the reflective member 40 and may be provided to a user's left eye through the left eye lens 10a. Accordingly, the user may view a virtual reality image that is displayed on the display device 110_1 through the left eye. In addition, the display device accommodating portions 50 may be disposed at both the left and right distal ends of the support frame 20. In this case, the user may view a virtual reality image that is displayed on the display device 110_1 through both the left and right eyes.

Figure 20:
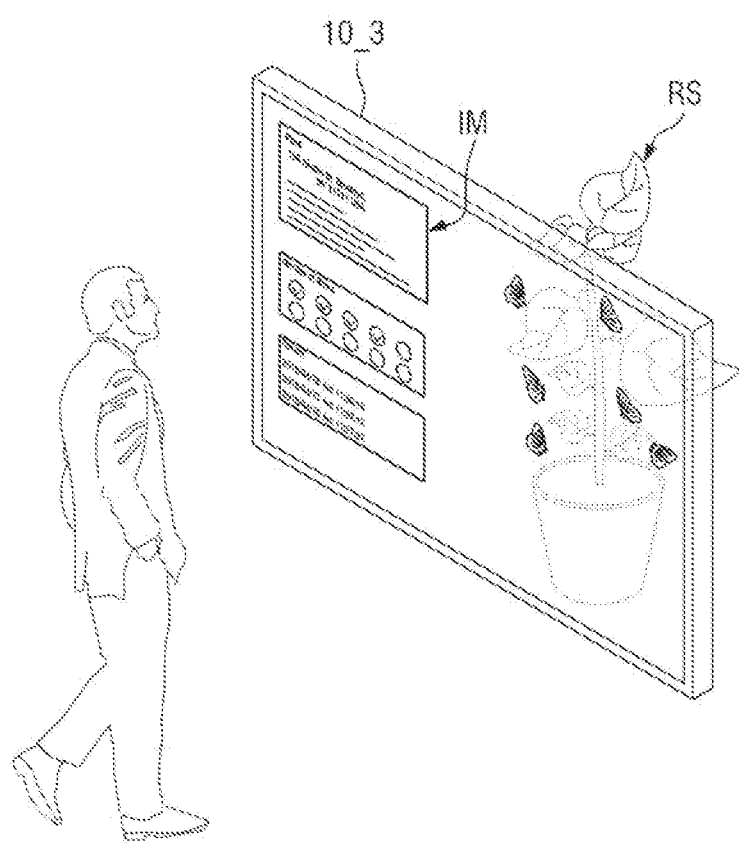
FIG. 20 is a view illustrating a transparent display device including the display device according to an embodiment of the present invention.

FIG. 20 is a view illustrating a transparent display device including the display device according to an embodiment of the present invention.

Referring to FIG. 20, a display device 10_3 in which the display module 100 and the optical member 200 are bonded to each other may be applied to a transparent display device 10_3. The transparent display device 10_3 may transmit light while displaying an image IM. Therefore, a user positioned in front of the transparent display 10_3 device might not only view the image IM displayed on the display module 100, but may also view an object RS or a background positioned on the back of or behind the transparent display device 10_3. When the display device, in which the display module 100 and the optical member 200 are bonded to each other, is applied to the transparent display device 10_3, the display panel 110 of the display device 10_3 may include a light transmitting portion capable of transmitting light or may be formed of a material capable of transmitting light.

While the present invention has been described with reference to the embodiments thereof, it will be understood by those of ordinary skill in the art that various changes in form and detail may be made thereto without departing from the spirit and scope of the present invention.

What is claimed is:

1. A display device comprising:
a display panel including a display area and a plurality of sub-pixels disposed in the display area;
an optical member bonded onto the display panel; and
a display driving unit configured to receive a correction coefficient for each viewing viewpoint of the display panel from a checking device of the display panel, to which the optical member is bonded, configured to correct image data for each viewing viewpoint using the correction coefficient for each viewing viewpoint, and configured to drive the display panel so that an image according to the corrected image data is displayed in the display area, wherein the correction coefficient is obtained by comparing an optical characteristic of a display image for one viewing viewpoint with an average optical characteristic value of remaining viewing viewpoints for the display image.

2. The display device of claim 1, wherein the display driving unit is configured to:
set a viewing viewpoint and a viewing viewpoint number according to the viewing viewpoint for each sub-pixel according to a relative arrangement position of each sub-pixel for each stereoscopic lens of the plurality of stereoscopic lenses of the optical member,
align an arrangement position for each horizontal line of the image data according to the viewing viewpoint and the viewing viewpoint number of each sub-pixel, and
display an image according to corrected image data in the display area by correcting image data for each viewing viewpoint with the correction coefficient for each viewing viewpoint.

3. The display device of claim 2, wherein the checking device includes:
an optical path conversion unit configured to modulate an optical path of the display image for each viewing viewpoint by reflecting the display image that is displayed on the display panel for each viewing viewpoint,
an optical characteristic detection unit configured to generate and output an optical characteristic detection signal by sequentially detecting optical characteristics of the display image for each viewing viewpoint of which the optical path is modulated by the optical path conversion unit, and an optical characteristic analysis unit configured to generate and output a correction coefficient for each viewing viewpoint according to the optical characteristics for each viewing viewpoint by analyzing the optical characteristic detection signal for each viewing viewpoint output from the optical characteristic detection unit.

4. The display device of claim 3, wherein the viewing viewpoints and the viewing viewpoint numbers of the display panel correspond to or are included in a width of one of the stereoscopic lenses of the optical member in a thickness direction, and are set to be equal to the number of sub-pixels disposed on a first surface of each stereoscopic lens.

5. The display device of claim 3, wherein the optical characteristic detection unit is configured to:
   detect optical characteristics of any one of luminance, illumination, or light quantity of the display image for each viewing viewpoint that is displayed on the display panel and whose optical path is modulated by the optical path conversion unit, and
   transmit the optical characteristic detection signal corresponding to the optical characteristics of any one of the luminance, illumination, or light quantity to the optical characteristic analysis unit.

6. The display device of claim 3, wherein the optical characteristic analysis unit is configured to:
   convert the optical characteristic detection signal for each viewing viewpoint into a digital signal, and analyze an average optical characteristic value of remaining viewing viewpoints that is compared to the converted optical characteristic value for each viewing viewpoint, and
   extract or calculate the correction coefficient for each viewing viewpoint such that a difference between the optical characteristic value for each viewing viewpoint and the average optical characteristic value for the remaining viewing viewpoints is minimized by comparing the optical characteristic value for each viewing viewpoint with the average optical characteristic value of the remaining viewing viewpoints.

7. The display device of claim 3, wherein the optical path conversion unit includes:
   a flat reflective panel configured to change optical paths of display images for each viewing viewpoint by primarily reflecting and refracting the display images that are sequentially emitted from the display panel for each viewing viewpoint; and
   a curved reflective panel configured to condense the optical paths of the display images for each viewing viewpoint in a direction of the optical characteristic detection unit by secondarily reflecting and refracting the display images for each viewing viewpoint that are reflected from the flat reflective panel.

8. The display device of claim 7, wherein the optical path conversion unit further includes:
   a first position adjustment module configured to fix the display panel by adjusting an arrangement position and horizontal and vertical axis angles of the display panel so that the display panel is disposed toward the flat reflective panel;
   a second position adjustment module configured to fix the flat reflective panel by adjusting an arrangement position and horizontal and vertical axis angles of the flat reflective panel so that the display images for each viewing viewpoint that are displayed on the display panel are primarily reflected and refracted by the flat reflective panel to the curved reflective panel; and
   a third position adjustment module configured to fix the curved reflective panel by adjusting an arrangement position and horizontal and vertical axis angles of the curved reflective panel so that the display images for each viewing viewpoint that are primarily reflected and refracted by the flat reflective panel are secondarily reflected and refracted by the curved reflective panel to the optical characteristic detection unit.

9. The display device of claim 8, wherein the flat reflective panel is disposed and fixed at a position where lengths of light paths, for each viewing viewpoint, that are displayed on the display panel to be primarily reflected from the flat reflective panel and that are secondarily reflected from the curved reflective panel to be incident to the optical characteristic detection unit are all a same as each other.

10. The display device of claim 8, wherein the curved reflective panel is formed in a semicircular or a semi-elliptical curvature trajectory shape so that an inner surface forming a curvature maintains a same distance from the optical characteristic detection unit, and
    the optical characteristic detection unit is disposed at a position of a central point of the curvature trajectory formed by the curved reflective panel to maintain the same distance as a whole from the inner surface having the curvature of the curved reflective panel.

11. A checking system comprising:
    a display device configured to display a stereoscopic image through a display panel to which an optical member is attached; and
    a checking device configured to detect optical characteristics of a display image for each viewing viewpoint of the display panel and configured to generate and output a correction coefficient for each viewing viewpoint according to the optical characteristics for each viewing viewpoint,
    wherein the checking device is configured to:
    modulate an optical path of the display image for each viewing viewpoint by reflecting and refracting the display image that is displayed on the display panel for each viewing viewpoint,
    generate optical characteristic detection signals by detecting the optical characteristics of the display image for each viewing viewpoint in which the optical path is modulated, and
    extract a correction coefficient for each viewing viewpoint according to an analysis result of the optical characteristic detection signals for each viewing viewpoint and supply the extracted correction coefficient to the display device.

12. The checking system of claim 11, wherein the checking device includes:
    an optical path conversion unit configured to modulate an optical path of a display image for each viewing viewpoint by reflecting the display image that is displayed on the display panel for each viewing viewpoint,
    an optical characteristic detection unit configured to generate and output an optical characteristic detection signal by sequentially detecting optical characteristics of the display image for each viewing viewpoint of which the optical path is modulated by the optical path conversion unit, and
    an optical characteristic analysis unit configured to generate and output a correction coefficient for each viewing viewpoint according to the optical characteristics for each viewing viewpoint by analyzing the optical characteristic detection signal for each viewing viewpoint output from the optical characteristic detection unit.

13. The checking system of claim 12, wherein the optical characteristic detection unit is configured to:
 detect optical characteristics of any one of luminance, illumination, or light quantity of the display image for each viewing viewpoint that is displayed on the display panel and whose optical path is modulated by the optical path conversion unit, and
 transmit the optical characteristic detection signal corresponding to the optical characteristics of any one of the luminance, illumination, or light quantity to the optical characteristic analysis unit.

14. The checking system of claim 12, wherein the optical characteristic analysis unit is configured to:
 convert the optical characteristic detection signal for each viewing viewpoint into a digital signal, and analyze average optical characteristic values of remaining viewing viewpoints that are compared to the converted optical characteristic value for each viewing viewpoint, and
 extract or calculate the correction coefficient for each viewing viewpoint such that a difference between the optical characteristic value for each viewing viewpoint and the average optical characteristic value for the remaining viewing viewpoints is minimized by comparing the optical characteristic value for each viewing viewpoint with the average optical characteristic value of the remaining viewing viewpoints.

15. The checking system of claim 12, wherein the optical path conversion unit includes:
 a flat reflective panel configured to change optical paths of display images for each viewing viewpoint by primarily reflecting and refracting the display images that are sequentially emitted from the display panel for each viewing viewpoint; and
 a curved reflective panel configured to condense the optical paths of the display images for each viewing viewpoint in a direction of the optical characteristic detection unit by secondarily reflecting and refracting the display images for each viewing viewpoint that are reflected from the flat reflective panel.

16. The checking system of claim 15, wherein the optical path conversion unit further includes:
 a first position adjustment module configured to fix the display panel by adjusting an arrangement position and horizontal and vertical axis angles of the display panel so that the display panel is disposed toward the flat reflective panel;
 a second position adjustment module configured to fix the flat reflective panel by adjusting an arrangement position and horizontal and vertical axis angles of the flat reflective panel so that the display images for each viewing viewpoint that are displayed on the display panel are primarily reflected and refracted by the flat reflective panel to the curved reflective panel; and
 a third position adjustment module configured to fix the curved reflective panel by adjusting an arrangement position and horizontal and vertical axis angles of the curved reflective panel so that the display images for each viewing viewpoint that are primarily reflected and refracted by the flat reflective panel are secondarily reflected and refracted by the curved reflective panel to the optical characteristic detection unit.

17. The checking system of claim 16, wherein the flat reflective panel is disposed and fixed at a position where lengths of light paths, for each viewing viewpoint, that are displayed on the display panel to be primarily reflected from the flat reflective panel and that are secondarily reflected from the curved reflective panel to be incident to the optical characteristic detection unit are all a same as each other.

18. The checking system of claim 16, wherein the curved reflective panel is formed in a semicircular or a semi-elliptical curvature trajectory shape so that an inner surface forming a curvature maintains a same distance from the optical characteristic detection unit, and
 the optical characteristic detection unit is disposed at a position of a central point of the curvature trajectory formed by the curved reflective panel to maintain the same distance as a whole from the inner surface having the curvature of the curved reflective panel.

19. The checking system of claim 16, wherein the optical characteristic detection unit is configured to:
 be installed in the first or second position adjustment module disposed in a direction facing the curved reflective panel, and
 be disposed in a direction facing the curved reflective panel to be directed to a center point of the curved reflective panel.

20. An electronic device including a display device, wherein the display device comprising:
 a display panel including a display area and a plurality of sub-pixels disposed in the display area;
 an optical member bonded onto the display panel; and
 a display driving unit configured to receive a correction coefficient for each viewing viewpoint of the display panel from a checking device of the display panel, to which the optical member is bonded, configured to correct image data for each viewing viewpoint using the correction coefficient for each viewing viewpoint, and configured to drive the display panel so that an image according to the corrected image data is displayed in the display area, wherein the correction coefficient is obtained by comparing an optical characteristic of a display image for one viewing viewpoint with an average optical characteristic value of remaining viewing viewpoints for the display image.

* * * * *